United States Patent [19]

Vartanyan

[11] Patent Number: 5,737,219
[45] Date of Patent: Apr. 7, 1998

[54] METHOD OF MONITORING DEFORMATION OF GEOLOGICAL STRUCTURES AND PREDICTING GEODYNAMIC EVENTS

[75] Inventor: Genrich Senekerimovich Vartanyan, Zeleny, Russian Federation

[73] Assignees: All-Russian Research Institute for Hydrogeology and Engineering Geology, Zeleny, Russian Federation; Danmarks Geologiske Undersøgelse, Copenhagen, Denmark; Geoteknisk Institut, Lyngby, Denmark; Krüger A/S, Søborg, Denmark

[21] Appl. No.: 416,846

[22] PCT Filed: Oct. 15, 1993

[86] PCT No.: PCT/DK93/00337

§ 371 Date: Apr. 14, 1995

§ 102(e) Date: Apr. 14, 1995

[87] PCT Pub. No.: WO94/09384

PCT Pub. Date: Apr. 28, 1994

[30] Foreign Application Priority Data

Oct. 15, 1992 [DK] Denmark ................................ 1267/92

[51] Int. Cl.$^6$ ........................................................ G01V 1/00
[52] U.S. Cl. ...................................... 364/421; 367/38
[58] Field of Search ........................ 364/421; 367/37–85; 324/344–346, 348–353

[56] References Cited

U.S. PATENT DOCUMENTS 4,727,488 2/1988 Flinchbaugh .

4,884,030 11/1989 Naville et al. .
4,904,943 2/1990 Takahashi .

FOREIGN PATENT DOCUMENTS 791021 7/1993 Russian Federation .
2183038 5/1987 United Kingdom .

OTHER PUBLICATIONS

Derwent's abstract, No. C7600 E/10, week 8210, Abstract of SU–A–834649 (AS Tadz Seismology) 10 Jun. 1981, entitled "Earthquake Seismic Prediction . . . Anomalies in Deformation Rate and Direction Found".

Derwent's abstract, No. 92–022657/03, week 9203, Abstract of SU–A–1628026 (AS UZB Seismology), 15 Feb., 1991, entitled "Method of Long Time Forecasting of Severe Earthquakes . . . ".

*Primary Examiner*—James P. Trammell
*Attorney, Agent, or Firm*—Watson Cole Stevens Davis, P.L.L.C.

[57] ABSTRACT

A method of monitoring short-term and long-term deformation changes in a geological space and predicting geodynamic events in a region, such as earthquakes, landslides, dilatations and subsidence events, which includes the steps of performing measurements of one or more hydrosphere parameters using a network of observation wells covering the region, calculating various mathematical parameters and preparing various diagrams, and using the diagrams prepared as a basis for detecting and predicting the time of a possible future geodynamic event.

9 Claims, 24 Drawing Sheets

METHOD OF MONITORING DEFORMATION OF GEOLOGICAL STRUCTURES AND PREDICTING GEODYNAMIC EVENTS

This application is a 371 of PCT/DK93/00327 filed Oct. 15, 1993.

BACKGROUND OF THE INVENTION

The present invention relates to a method of monitoring short-term deformation changes in a geological space and predicting seismic events, such as earthquakes and landslides, in a region, wherein the method includes the steps of:

(a) performing at different times (t=0, t=t1) measurements of one or more parameters, X, Y, Z . . . . in an aquifer in a number of locations throughout the area of the region using a corresponding number of observation wells;

(b) calculating the Relative Deformation Coefficient, e, for each location and for each parameter X, Y, Z . . . on the basis of the measuring values obtained and using the formulas $$e_{t1} = \frac{X_{t=0}}{X_{t=t1}} \ (1); \ e_{t1} = \frac{Y_{t=0}}{Y_{t=t1}} \ (1); \ e_{t1} = \frac{Z_{t=0}}{Z_{t=t1}} \ (1) \ldots$$

wherein $X_{t=0}$, $Y_{t=0}$, $Z_{t=0}$ are the values of parameter X, Y, Z respectively at time t=0 (reference time), $X_{t=t1}$, $Y_{t=t1}$, $Z_{t=t1}$ are the values of parameter X, Y, Z respectively at time t=t1; and (c) preparing a contour map of e-isolines for each parameter X, Y, Z . . . on the basis of the calculated e-values and using the contour maps prepared to identify short living deformation structures of potential seismic danger.

Geological observations have shown that in the earth's crust volumetric deformation continuously gives rise to the formation and destruction of either compacted or expanded subsurface structures of increased tension or stress-strain (Vartanyan-Kulikov's effect). Such structures are usually formed and destroyed in a matter of days or months, and they are commonly referred to as short living structures of deformation.

Such short living structures may appear all over the globe and they may periodically cover an area of hundreds and sometimes thousands of square kilometers.

As mentioned above, short living structures of deformation are formed and destructed continuously, i.e., also during geodynamically quiet periods, and usually in a chaotic manner.

Spatial volumetric stress-strain state microvariations of the lithosphere developing in real time and registered through subsurface variations in hydrosphere parameters are commonly referred to as the hydrogeodeformation (HGD) field. The visualization of the HGD field development is based on the application of special equipment and procedures.

Methods and apparatus which allow a measurement of the relative deformation of subsurface structures of the order of magnitude of $1 \cdot 10^{-7}$ to $1 \cdot 10^{-9}$ have been developed for use in connection with the monitoring and study of short living structures of deformation.

SUMMARY OF THE INVENTION

The invention is characterized in that it includes the additional steps of:

(d) calculating the Relative Deformation Parameter, $D_e$, for each structure having been identified as being of potential seismic danger, the $D_e$-parameter being defined as $$D_e = \frac{1}{2 \cdot S_{ref} \cdot e_{ref}} \ [(e_1 + e_2)(S_1 - S_2) + (e_2 + e_3)(S_2 - S_3) + \ldots + \ (e_{n-1} + e_n)(S_{n-1} - S_n)] \quad (2)$$

wherein $e_1, e_2, e_3, \ldots, e_{n-1}$ and $e_n$ are e-values of e-isolines in the structure, $S_1, S_2, S_3, \ldots, S_{n-1}$ and $S_n$ are the areas delimited by isolines $e_1, e_2, e_3, \ldots, e_{n-1}$ and $e_n$ respectively, $S_{ref}$ is a reference area, $e_{ref}$ is a reference e-value, and n is a positive integer;

(e) calculating the Parameter of Seismic Attack, $A_e$, defined as $$A_e = \frac{\partial D_e}{\partial t}, \text{ and} \quad (3)$$

(f) preparing a diagram of $D_e$ vs. t and a diagram of $A_e^m$ vs. t, wherein m is a positive integer, drawing a subsidiary curve through the top points of the peaks of the latter diagram and using the two resulting diagrams in combination as a basis for predicting the time of a possible future seismic event.

The method of the invention has provided a possibility of predicting the time, magnitude and position of a future possible seismic event. In particular, it is very valuable to be able to predict strong and catastrophic seismic events, i.e., seismic events having a Magnitude, M, of 4,5 or higher.

The invention is based on the discovery that by monitoring a HGD-field over vast regions it is possible to assess the state and development of short living structures of deformation and to forecast future seismic events.

Thus, during the period preceding a seismic event, the size of the short living structures of deformation and the intensity of tension within said structures are increasing, thereby forming well-defined bodies within future epicentral zones.

The invention is further based on the discovery that both a $D_e$-curve and an $A_e^m$-curve for a given short living structure of deformation has a characteristic course during a build-up within the structure of tension leading to a strong and catastrophic seismic event, and that the two curves in combination can be used to predict the time of a future possible seismic event with high accuracy, i.e., within a matter of days.

The basis of the method of the invention is a system of specialized observation wells which are used to collect the measurements of parameters X, Y, Z . . . . . Thus, the observation wells are equipped with measuring apparatus designed to perform measurements of parameters X, Y, Z . . .

The individual observation wells are preferably connected to a central automatic data processing unit capable of automatically registering, storing and processing all data. Preferably, steps b)–f) of the method of the invention are performed by the data processing unit.

The observation wells are placed throughout the region with due consideration to the dynamic characteristics of individual geological structures and tectonic blocks. Preferably, at least one observation well is used for each mesostructure. In seismic-active regions, preferably at least one well is used for an area of 10,000 square kilometers, whereas in platform regions and other stable regions, at least one well is used for an area of 40,000 square kilometers.

The measuring parameters X, Y, Z . . . may be any measurable parameter, such as water level, water pressure, concentration of dissolved chemical substances, equilibrium of chemical substances, concentration of gases, water temperature, electrical conductivity of water, water density, seismic noise, electromagnetic emission, gravity variation or other.

Examples of dissolved chemical substances are $Cl^-$, $F^-$, $SO_4^{2-}$ and $Li^+$.

Examples of gases are $CO_2$, He, methane, $H_2S$ and Rn (radon).

When measurements of more than one parameter are used to determine an e-value, the individual parameters are evaluated in respect of their relative suitability. The evaluation is made by the user of the method of the invention on the basis of experience, analysis of historical data and knowledge of the measuring uncertainty of the different measuring methods used.

A preferred embodiment of the invention is characterized in using the water level, h, as a measuring parameter and calculating e using the formula $$e_{t1} = \frac{h_o}{h_{t1}} \quad (4)$$

wherein $h_o$ is the water level at t=0, and $h_{t1}$ is the water level at t=t1.

The calculated e-values are used to draw up a contour map. The contour map is prepared in a traditional manner by interpolating between the locations at which the e-values have been determined and subsequently drawing e-isolines.

The contour map prepared is used to identify short living deformation structures of potential seismic danger within the region monitored. The identification is made on the basis of observations of the temporal development of the isoline pattern of the structure and of the magnitude of the e-values of the isoline pattern. An isoline pattern having e-values which deviate highly from unity indicates that a large deformation has taken place in the corresponding structure as compared to the reference time t=0.

Then, the $D_e$- and $A_e$-values are calculated for each structure identified as being of potential seismic danger.

The calculated $D_e$- and $A_e$-values are then plotted as a function of time in a (t,$D_e$)-diagram and a (t,$A_e^m$)-diagram, respectively.

Preferably, a diagram of $A_e^m$ vs. t, wherein m is an even positive integer is used, and most preferably, a diagram of $A_e^m$ vs. t wherein m is 2 or 4, is used.

As mentioned above, the $D_e$-curve and the $A_e^m$-curve both have a characteristic course, which when the two curves are viewed in combination render it possible to predict a) whether a seismic event will occur and b) if so, the time of the event.

The appearance of the noted two curves will in part depend on the number of e-values used in formula (2). Therefore, the same number of e-values must be used in the calculation of each $D_e$-value of a $D_e$-curve. However, when a $D_e$-curve is determined in this manner, the general course and thus the characteristic course will not depend on the number of e-values used in formula (2).

The $D_e$- and $A_e^m$-curve for the potentially dangerous short living structures of deformation of the region should be monitored continuously as the general appearance of the HGD-field in a region will change continuously. Thus, at one moment in time a region usually includes structures with increasing tension as well as structures with decreasing tension, and the tension of a potentially dangerous structure with a $D_e$-value rising over a period of time may well start to decrease without reaching a critical level. Also, the deformation rates of compaction and expansion for the structures vary greatly as a function of time.

In case the $D_e$- and $A_e^m$-curve for a structure show that a seismic event will occur the approximate position of said event, i.e. the epicenter, can be determined. Epicenters of seismic events coincide either with the axial zones of short living structures of expansion or, in the case of a region comprising two relatively closely situated short living structures of deformation one of which is expanding and one of which is compacting, with the interface zones of high tension gradient between the two structures.

In any event, the tectonic conditions of the region in question should be taken into consideration when determining the epicenter, since when the earth's crust of the region contains, e.g., a fault, the epicenter is likely to be situated within the fault zone.

Furthermore, the intensity of a future seismic event predicted can be assessed from the magnitude of the parameter $D_e$. Thus, the higher $D_e$-value, the higher Magnitude, M.

BRIEF DESCRIPTION OF THE DRAWINGS

In the following, the invention is described in further detail with reference to the drawings, wherein FIGS. 8–16 show contour maps of the region, in which the Loma Prieta earthquake occurred in 1989, for nine different dates.

DETAILED DESCRIPTION OF THE INVENTION

In the following, the manner of interpreting the $D_e$- and $A_e^m$-curve is described in further detail with reference to FIGS. 1 and 2.

As mentioned above, both the $D_e$-curve and the $A_e^m$-curve have a characteristic course during the build-up of an earthquake.

In the following it is explained how the time of a future earthquake may be determined from these curves.

Figure 1:
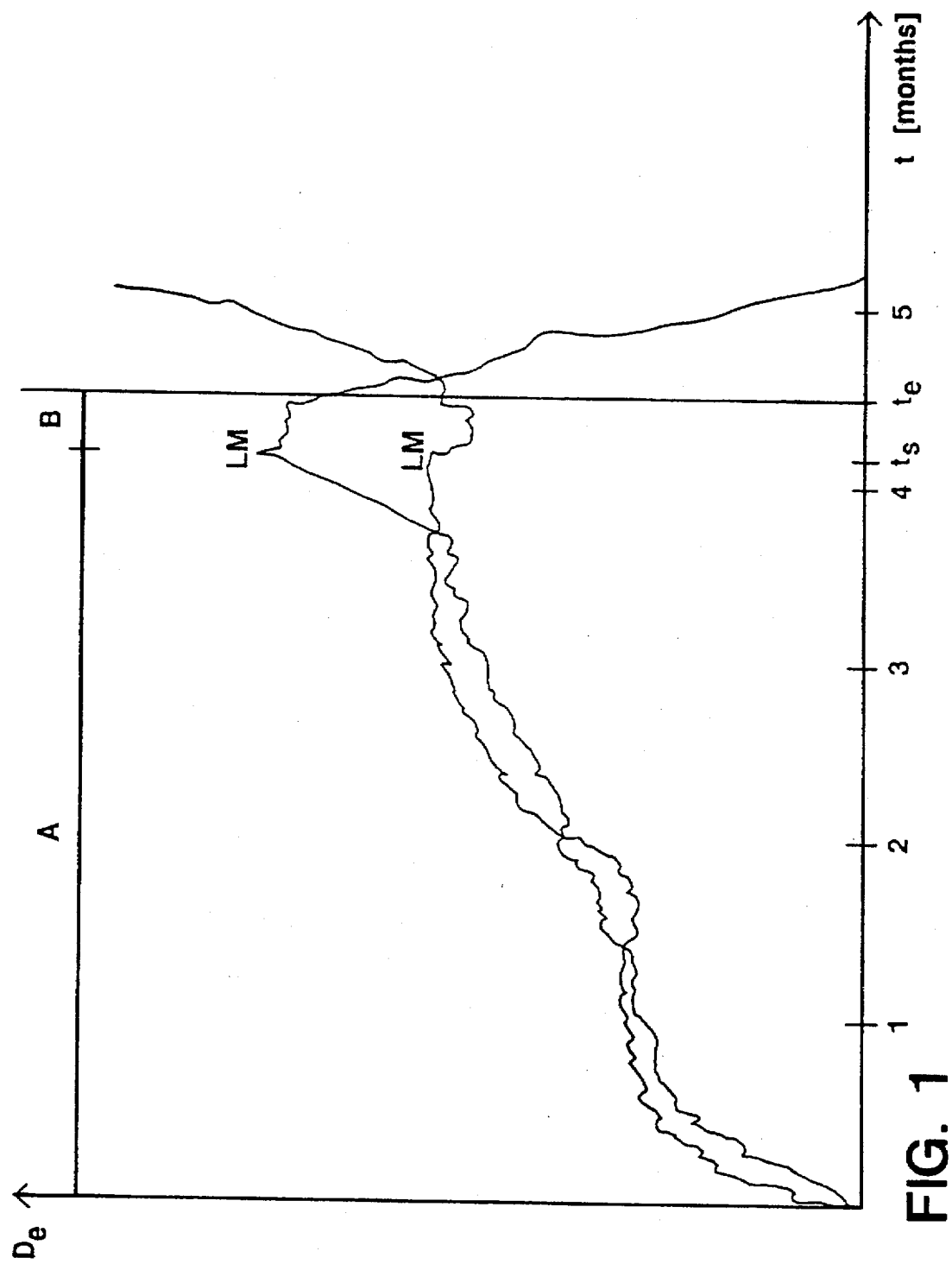
FIG. 1 shows two examples of typical $D_e$-curves having a similar course.

As will appear from FIG. 1, the $D_e$-curve increases in phase A corresponding to a build-up of tension within the structure observed. At the end of phase A, the $D_e$-curve reaches a local maximum LM at $t=t_s$, after which the $D_e$-curve decreases sharply and markedly during the first stage of phase B. In the last stage of phase B the $D_e$-curve may decrease vaguely or rise sharply depending on the nature of the structure in question. At the end of phase B, i.e., at $t=t_e$, an earthquake will occur and empirical data have shown that the duration of phase B is from about 3 days to about 10 days.

During the period of phase B, the tension resistance limit of the structure is reached, and fissuring of the structure is initiated.

Figure 2:
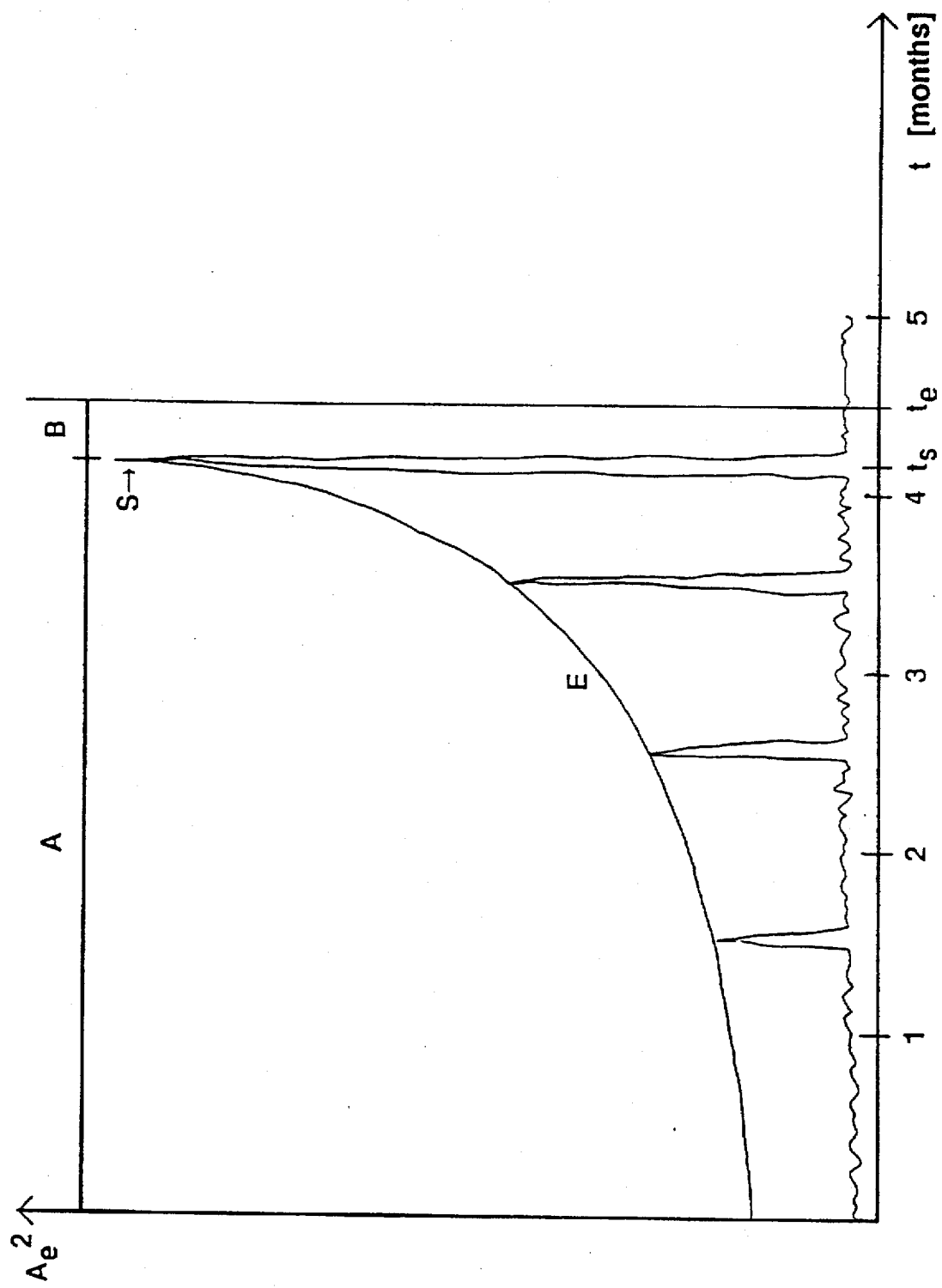
FIG. 2 shows an example of a typical $A_e^m$-curve.

As will appear from FIG. 2 the $A_e^2$-curve comprises a number of high peaks having a progressively increasing height with time and progressively diminishing intervals with time. In the time periods lying between the peaks only relatively small values of the $A_e^2$-parameter are occurring.

As mentioned above, an $A_e^m$-curve wherein m is 2 or 4 is preferably used. Such curves are used in order to reduce the influence of errors due to measuring noise, which will influence values of $A_e$ lying between the peaks. These values are usually smaller than 1. A m-value of 2 or 4 further increases the heights of the peaks, the $A_e$-values of which usually are higher than 1. Also, it is convenient to use curves having only positive values.

The physical meaning of the peaks of the $A_e^m$-curve is that at those moments the rate of deformation of the structure in question is especially high.

If a curve is drawn through the top points of the peaks, a curve having approximately the course of an exponential function is obtained (curve E, FIG. 2). The part of the E-curve where the direction of the tangent is approximately vertical (part S of the E-curve) corresponds to the local maximum LM of the $D_e$-curve and thus from the time corresponding to point S of the E-curve, i.e., from $t=t_s$, an earthquake will occur within a period of from about 3 days to about 10 days as it has been shown empirically.

As mentioned above, the $D_e$-curve and $A_e^m$-curve must be used in combination in order to make a certain and accurate prediction of the time of a future seismic event. Thus, the $D_e$-curve alone is not a sufficient basis for making such a prediction, since the $D_e$-curve having the general course described above exhibits an irregular zig-zag pattern in the general course, and correspondingly the $D_e$-curve exhibits a large number of sharp declines, which may be mistaken for the first stage of phase B.

The above-mentioned zig-zag pattern of the $D_e$-curve is due to fluctuating influences of small magnitude, such as gravitational influences (daily tidal fluctuations) and barometric pressure influences, whereas the general course of the $D_e$-curve is determined by endogenic influences, i.e., the build-up of tension within the structure due to compacting or expanding of the structure.

In the monitoring and assessment of the state of the structure, it is the sum of the individual natural and anthropogenic, if any, influences, i.e., the resulting influence, exerted on the structure, which should be taken into account, and the $D_e$-parameter expresses the response of the structure on precisely the resulting influence.

Examples of anthropogenic influences include the influence of high pressure dams, which increase the pressure exerted on subsurface structures, and the extraction of oil, gas and other fluids from subsurface structures.

In connection with the present invention the expression "short-term changes" means changes developing within a structure over a period of days to months.

Furthermore, the terms "$D_e$-curve" and "$A_e^m$-curve" refer to a curve of a diagram of $D_e$ vs. t and a curve of a diagram of $A_e^m$ vs. t, respectively.

The invention further relates to a method of monitoring long-term geodynamic processes, such as slow "earthquakes", long-term dilatations, plastic deformation of rocks and subsidence events, in a region, wherein the method includes the steps of:

(o) performing at different times (t=0, t=t1) measurements of one or more parameters X, Y, Z ... in an aquifer in a number of locations throughout the area of the region using a corresponding number of observation wells;

(p) calculating the Relative Deformation Coefficient, e, for each location and for each parameter X, Y, Z ... on the basis of the measuring values obtained and using the formulas $$e_{t1} = \frac{X_{t=0}}{X_{t=t1}} \quad (1); \quad e_{t1} = \frac{Y_{t=0}}{Y_{t=t1}} \quad (1); \quad e_{t1} = \frac{Z_{t=0}}{Z_{t=t1}} \quad (1) \ldots$$

wherein $X_{t=0}$, $Y_{t=0}$, $Z_{t=0}$ are the values of parameter X, Y, Z respectively at time t=0 (reference time), $X_{t=t1}$, $Y_{t=t1}$, $Z_{t=t1}$ are the values of parameter X, Y, Z respectively at time t=t1.

This further method of the invention is characterized in that it includes the additional steps of:

(q) performing measurements in a number of locations throughout the area of the region of gravity change, $\Delta g_1, \Delta g_2, \ldots, \Delta g_k$, wherein k is a positive integer, and calculating the average gravity change, $\Delta g_{av}$;

(r) calculating the Parameter of Imbalanced Deformation $K_e$ for the region, the $K_e$-parameter being defined as $$K_e = \frac{e_{p,t1} + e_{c,t1} - 2}{e_{p,t1} - e_{c,t1}} \quad (5)$$

wherein $e_{p,t1}$ is the average e-value at t=t1 for all locations showing expansion (e>1), $e_{c,t1}$ is the average e-value at t=t1 for all locations showing compaction (e<1);

(s) preparing a diagram of $K_e$ vs.t, a diagram of $$K_e' = \frac{\partial K_e}{\partial t} \text{ vs.} t$$

and a diagram of $\Delta g_{av}$ vs. $K_e$ and using the three diagrams in combination as a basis for detecting possible future geodynamic events.

This further method according to the invention is based on the discovery that by monitoring HGD-fields over vast regions it is possible to assess the state and development of short living structures of deformation and to forecast future geodynamic events.

Also, the further method according to the invention is based on the discovery that the $K_e$-parameter expresses the overall tendency of the whole region monitored in respect of expansion and compaction and that the $K_e$-parameter may therefore be used as a means of monitoring long-term deformation changes within the region.

Finally, the further method of the invention is based on the discovery that a ($K_e$, $\Delta g_{av}$)-curve has a characteristic course during a period preceding a major geodynamic event of the type mentioned above, and that a $K_e$-curve, a $K_e'$-curve and a ($K_e$, $\Delta g_{av}$)-curve in combination can be used to detect and forecast possible future geodynamic events.

The further method according to the invention is, e.g., useful in identifying the existence of risk zones of geodynamic activity near industrial installations of particular safety and environmental risks, and in performing a continuous monitoring of the zones in order to detect long-term changes of safety-risk. Thus, the method provides the user thereof with such information, which allows him to take precautions in order to minimize potential damages on existing industrial installations of the noted type and to select the most suitable site for positioning a new industrial installation. Such industrial installations include bridges, tunnels, nuclear power plants, high pressure head dams, sites for disposal of highly toxic and radioactive waste materials, mines serving as sites for waste material disposal, chemical plants, oil refineries, underground gas and oil tanks, etc.

The $K_e$-values are in the range of −1 to +1, and negative and positive values signify an overall tendency in the region monitored of compaction or expansion, respectively.

The $K_e'$-parameter expresses the rate of deformation for the region taken as a whole, and the $K_e'$-curve serves to make it possible to identify the periods during which said rate is high. The $K_e'$-curve usually comprise a number of peaks corresponding to the periods of high deformation rate and a number of interjacent parts having relative small values of $K_e'$.

Solar and lunar influences give rise to variations in gravity for subsurface structures. When a subsurface structure is in its relaxed state, i.e., when the tension of the structure is non-existing or small, a ($K_e$, $\Delta g_{av}$)-curve for a period of one day (24 hours) will have the approximate form of an ellipse elongated in the direction of the $K_e$-axis, the curve starting and ending at approximately the same point.

However, it has now been shown that during a period preceding a major geodynamic event of the type mentioned above, the shape of the ($K_e$, $\Delta g_{av}$)-curve changes in such a manner that the curve becomes elongated in the direction of the $\Delta g_{av}$-axis and that the curve becomes irregular or even chaotic in shape. Such a change signifies that the subsurface structure monitored has lost its elasticity.

The information derivable from the $K_e$-curve, $K_e'$-curve and ($K_e$, $\Delta g_{av}$)-curve in combination allows the user of the present method to make an evaluation of the level of geodynamic activity in the region and to assess the state of the structures in the region with respect to accumulated tension and thus to assess the risk level of the region in respect of geodynamic events. Thus, it allows the user to identify the geodynamically most stable region of a territory and to forecast future geodynamic events within the region monitored.

When the further method of the invention is used to select the most suitable site for positioning a new industrial installation within a territory, the territory is preferably divided into two or more regions, and then analogue diagrams of $K_e$ vs.t, $K_e'$ vs.t and $\Delta g_{av}$ vs. $K_e$ are prepared for each region. Then, the geodynamically most stable and safe region may be identified by comparing the three diagrams of each region with the diagrams of other regions.

A preferred embodiment of the further method according to the invention is characterized in (t) preparing a contour map of e-isolines for each parameter X, Y, Z . . . on the basis of the calculated e-values and using the contour maps prepared as an additional information forming the basis for detecting possible future geodynamic events.

In connection with the present invention, the expression "long-term changes" means changes developing within a structure over a period of one year or more.

Furthermore, the terms "$K_e$-curve", "$K_e'$-curve" and "($K_e$, $\Delta g_{av}$)-curve" refer to a curve of a diagram of $K_e$ vs.t, a diagram of $K_e'$ vs.t and a diagram of $\Delta g_{av}$ vs. $K_e$, respectively.

The $K_e$-value may also be used in the method of the invention described in the first part of this specification.

Thus, another preferred embodiment of the method of the invention is characterized in (g) performing measurements in a number of locations throughout the area of the region of gravity change, $\Delta g_1, \Delta g_2, \ldots, \Delta g_k$, wherein k is a positive integer, and calculating the average gravity change, $\Delta g_{av}$;

(h) calculating the Parameter of Imbalanced Deformation $K_e$ for the region, the $K_e$-parameter being defined as $$K_e = \frac{e_{p,t1} + e_{c,t1} - 2}{e_{p,t1} - e_{c,t1}} \quad (5)$$

wherein $e_{p,t1}$ is the average e-value at t=t1 for all locations showing expansion (e>1), $e_{c,t1}$ is the average e-value at t=t1 for all locations showing compaction (e<1);

(i) preparing a diagram of $K_e$ vs.t, a diagram of $$K_e' = \frac{\partial K_e}{\partial t} \text{ vs.t}$$

and a diagram of $\Delta g_{av}$ vs. $K_e$ and using the three diagrams in combination as an additional information forming the basis for predicting possible future seismic events.

The physical meaning of the parameters $K_e$, $K_e'$ and $\Delta g_{av}$, the manner of preparing diagrams of $K_e$ vs.t, $K_e'$ vs.t and $\Delta g_{av}$ vs. $K_e$ and the nature of information derivable from the diagrams are explained above.

This information is also valuable in the process of interpreting and making predictions of possible, future seismic events from the $D_e$- and $A_e^m$-curve.

In both methods of the invention, a central automatic data processing unit is preferably used to register and store all measuring values and to automatically perform all the subsequent calculations and preparations of contour maps and various diagrams.

In the following, the methods of in the invention will be described in further detail with reference to the examples below.

EXAMPLE 1

During a period from August 1988 to December 1988, a region covering the southern part of Georgia and the northern part of Armenia was monitored using a number of observation wells to measure the water level in an aquifer of the region. On Dec. 7, 1988 the so-called Spitak earthquake having a Magnitude, M, of 6.9 occurred.

On the basis of the measuring values and using an integrated central computer system the e-values were calculated, contour maps were prepared, $D_e$- and $A_e$-values were calculated and diagrams of $D_e$ vs.t and $A_e^2$ vs. t were prepared and subsidiary curves E were drawn through the points of the peaks of the diagrams of the latter type.

Figure 3:
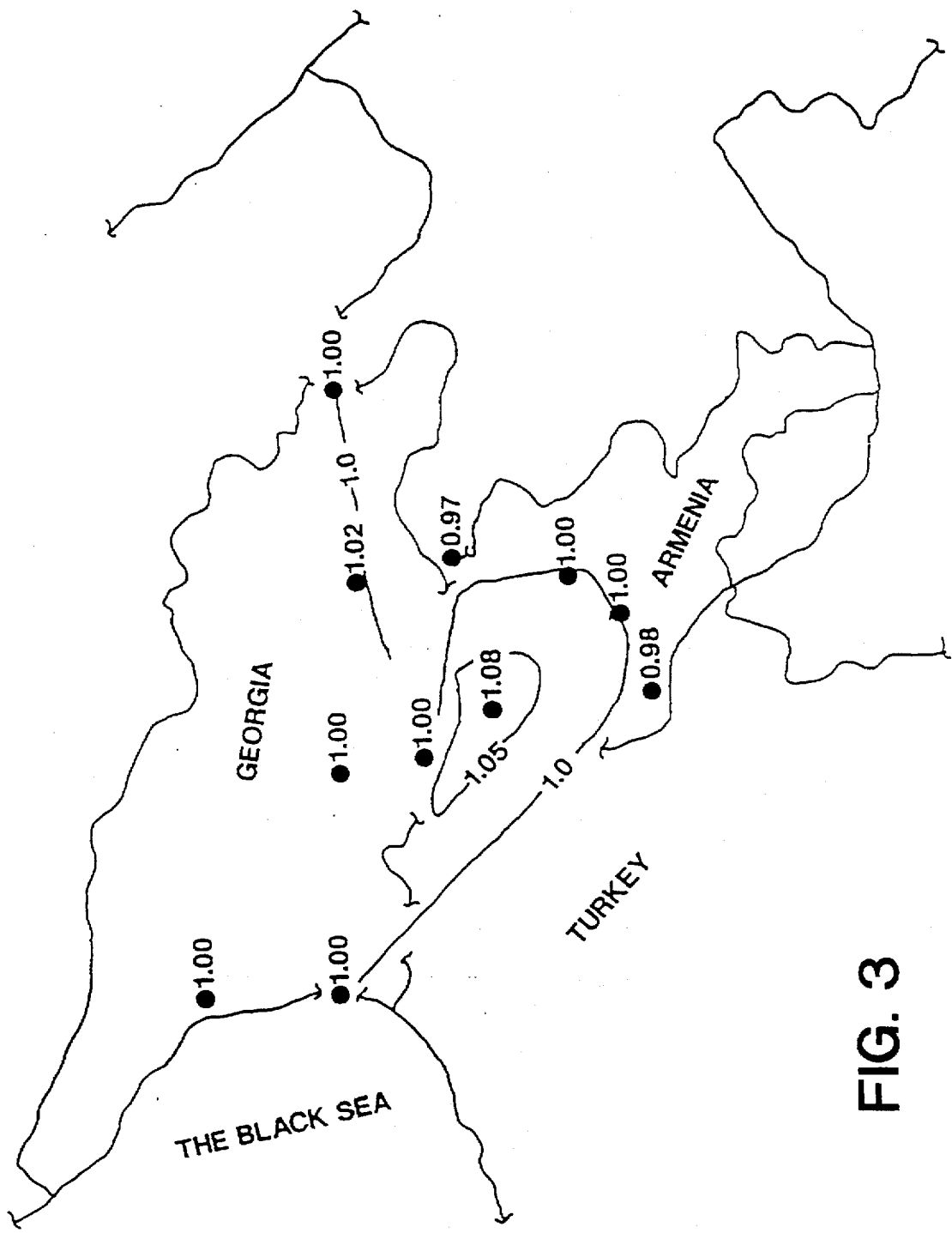
FIGS. 3–5 show contour maps of the region, in which the Spitak earthquake occurred in 1988, for three different dates.
Figure 4:
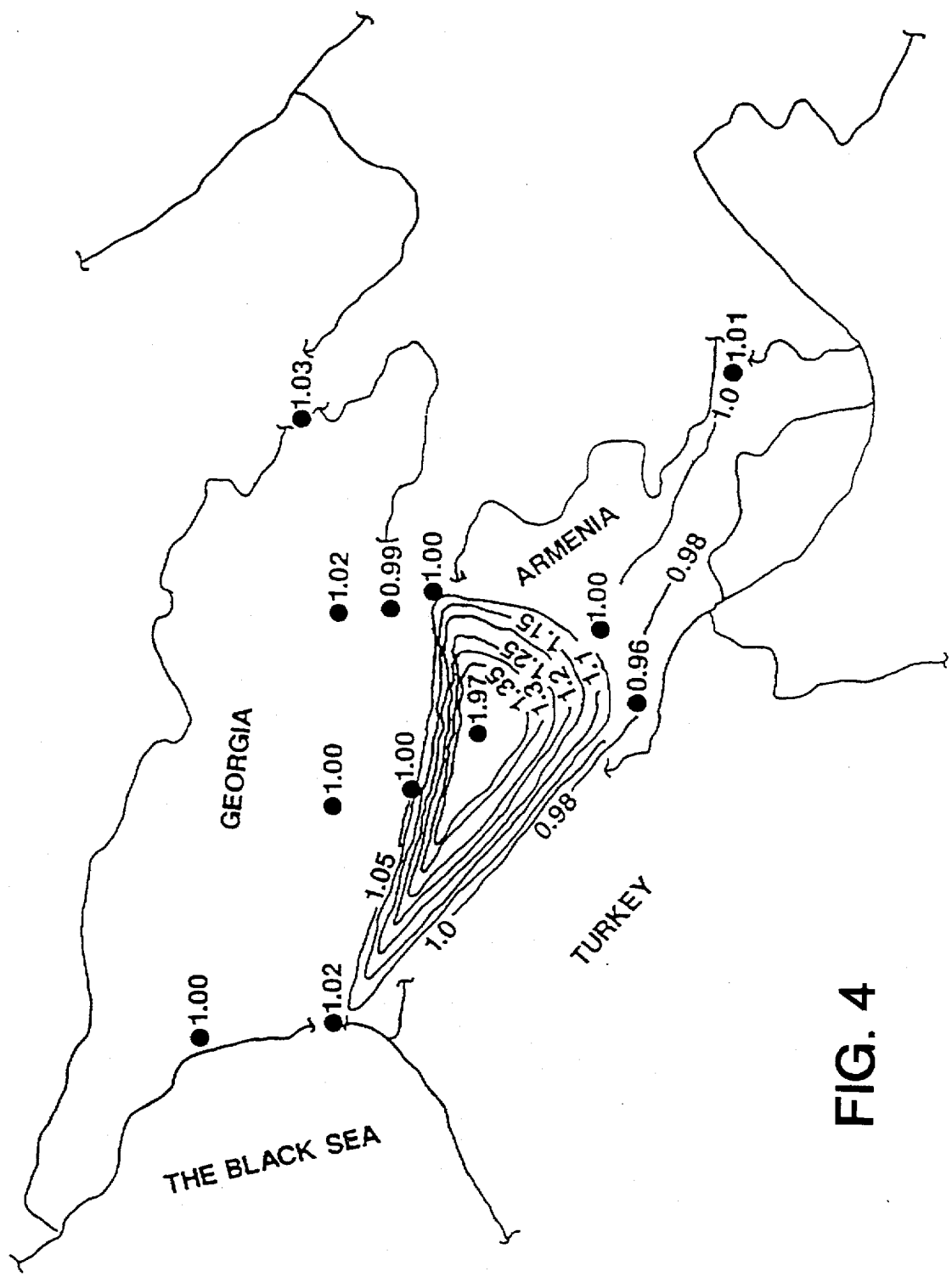
Figure 5:
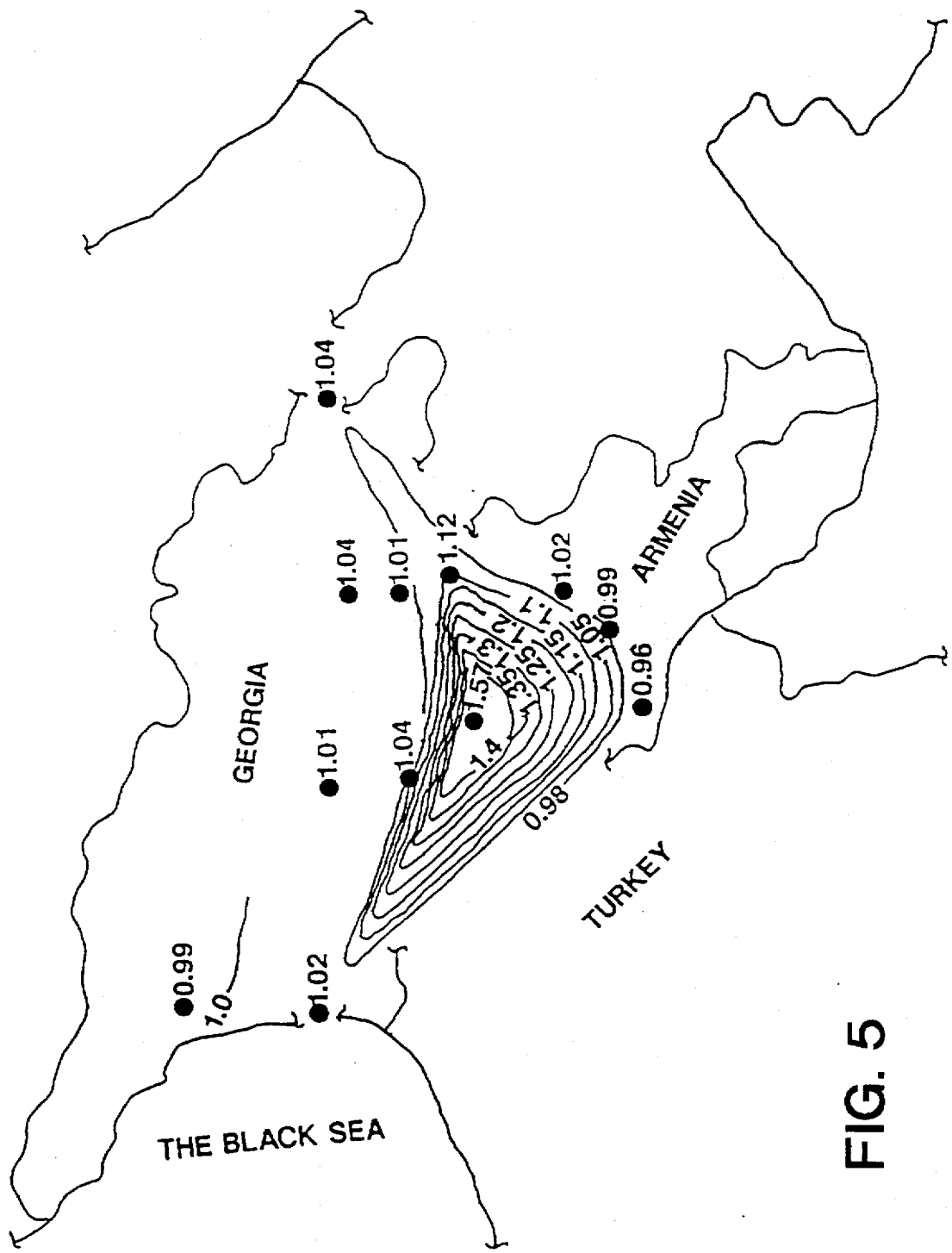

FIGS. 3–5 shows contour maps of the region monitored for Aug. 10, 1988, Dec. 7, 1988 and Dec. 10, 1988, respectively. In the Figures, observation wells are indicated with dots, and the Figures show the e-isolines and indicate e-values for both observations wells and e-isolines.

Figure 6:
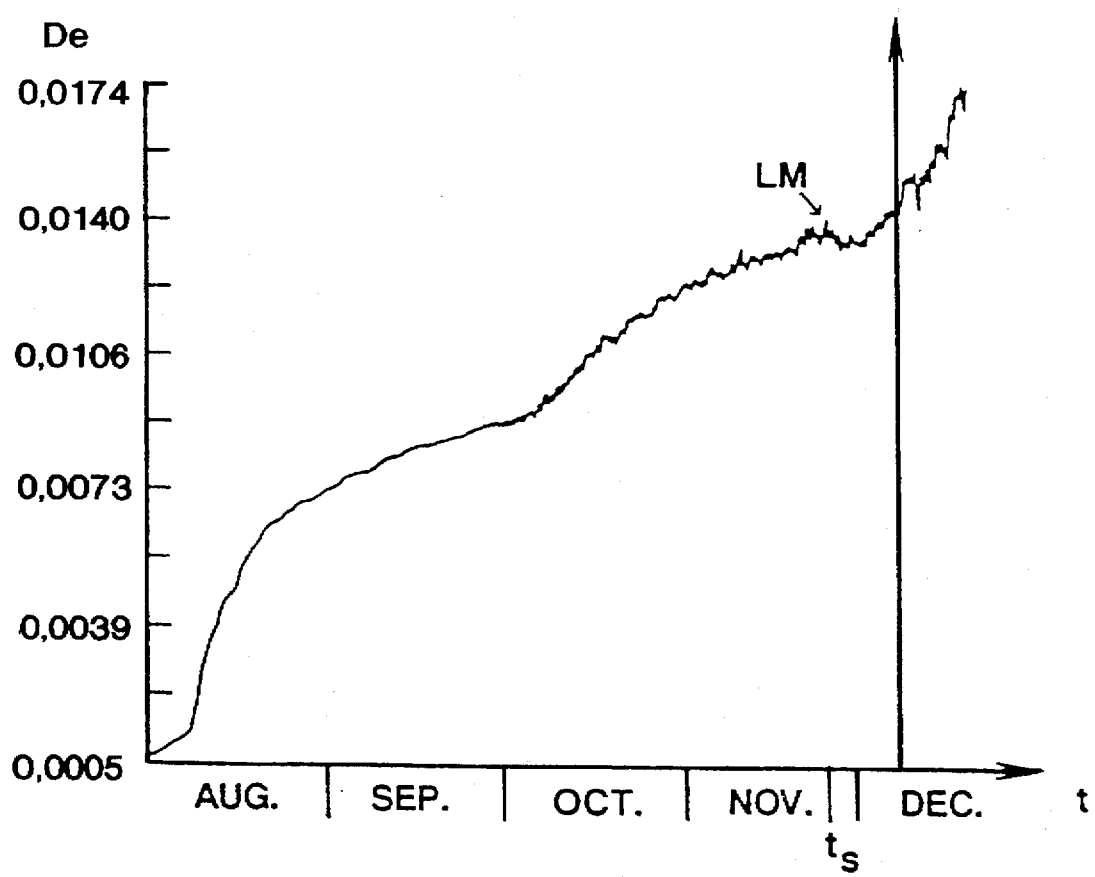
FIG. 6 shows a diagram of $D_e$ vs. t for the period during which the Spitak earthquake occurred.
Figure 7:
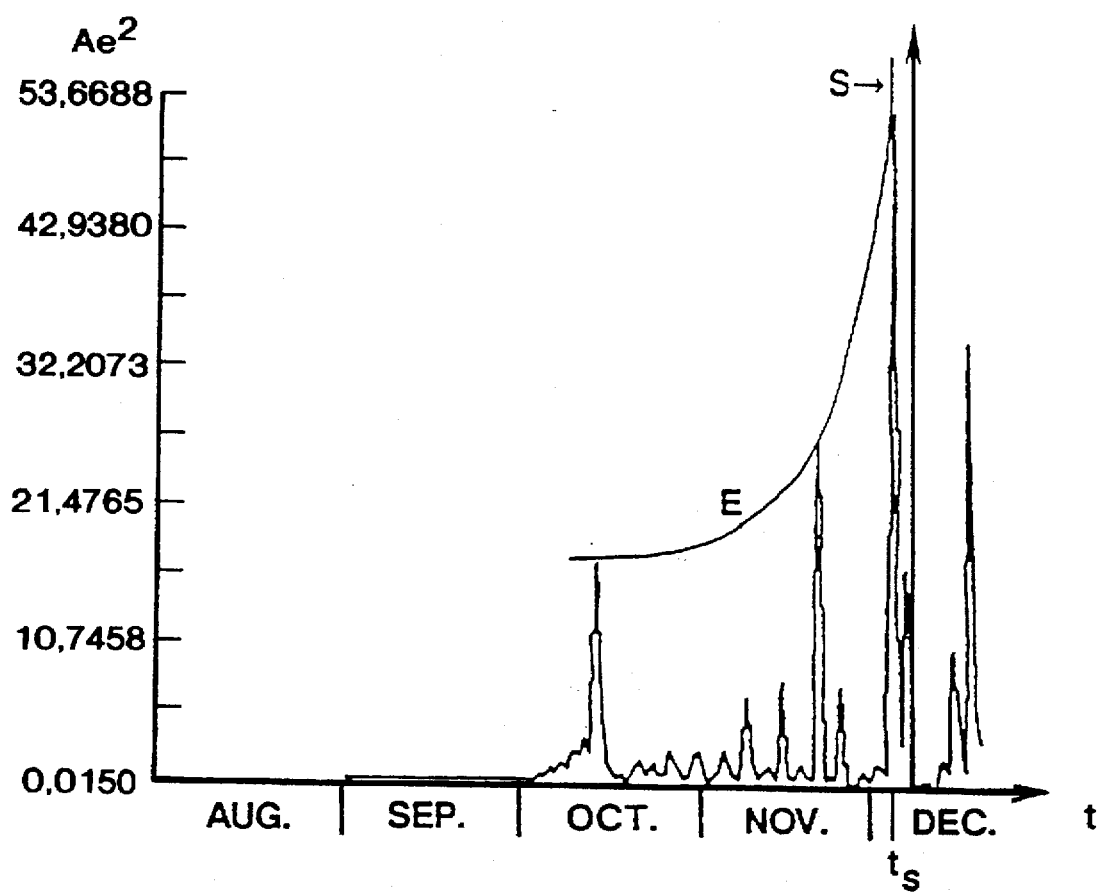
FIG. 7 shows a diagram of $A_e^2$ vs. t for the period during which the Spitak earthquake occured, the diagram being supplemented with a subsidiary curve E drawn through the top points of the peaks.
Figure 10:
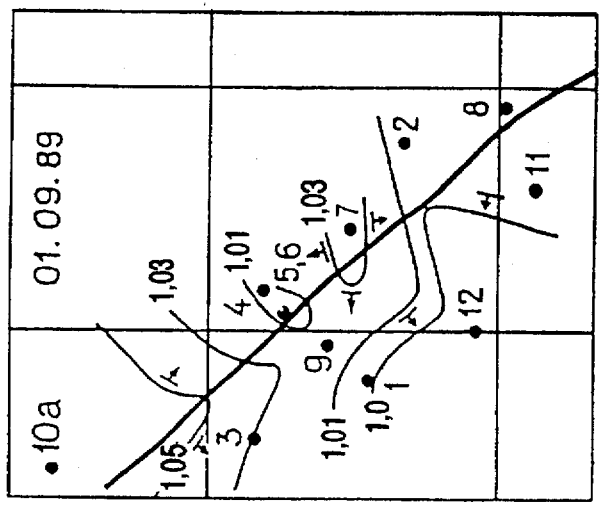
Figure 9:
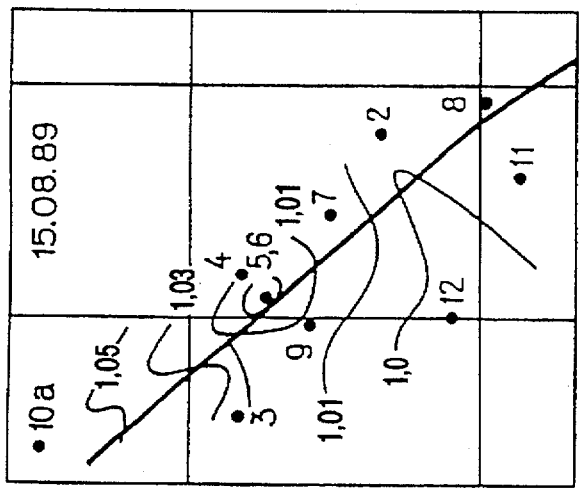
Figure 8:
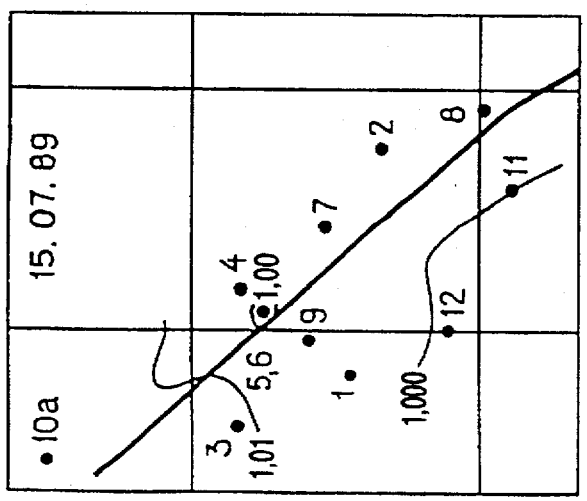
Figure 13:
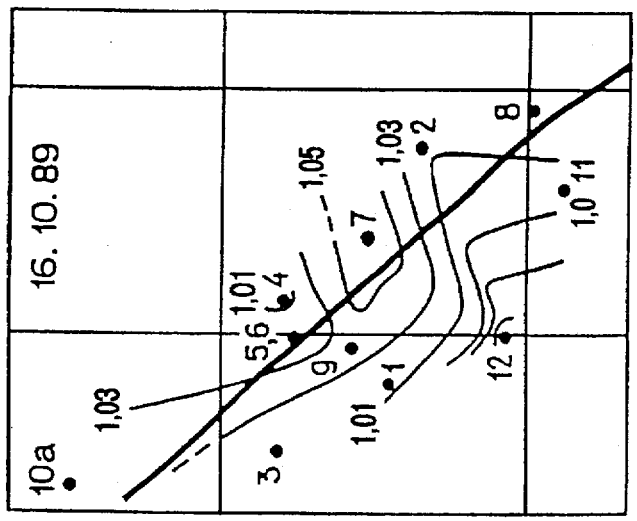
Figure 12:
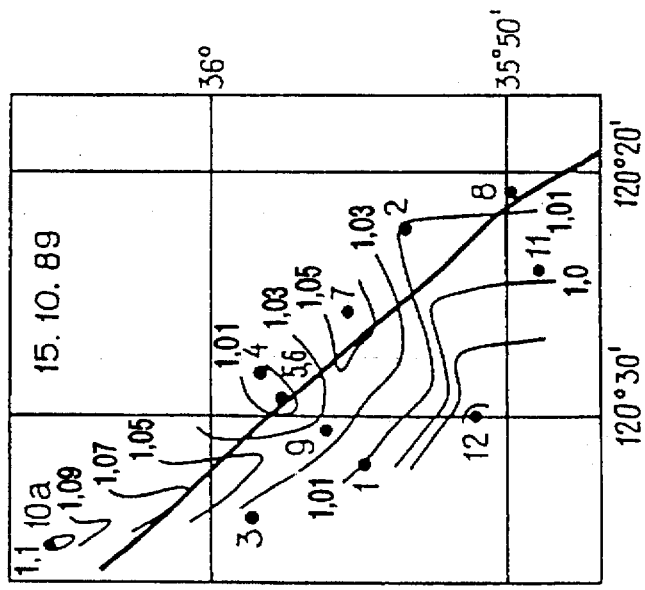
Figure 11:
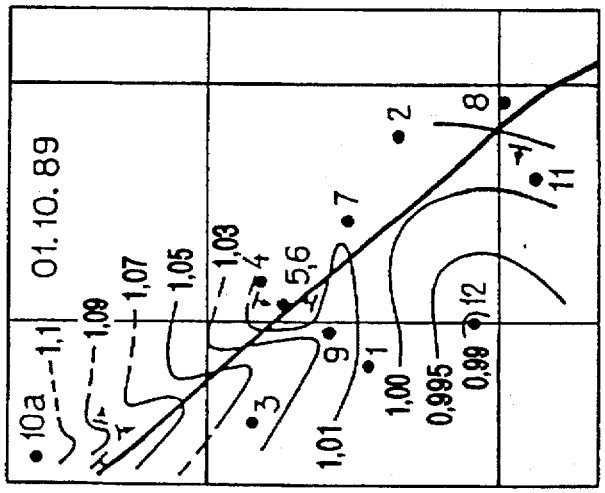

FIGS. 6 and 7 show diagrams of $D_e$ vs. t and $A_e^2$ vs.t respectively for the period from August 1988 to December 1988, the latter diagram being supplemented with a subsidiary curve E drawn through the top points of the peaks.

As will appear from the contour maps, a short living structure of expansion has developed during the period from Aug. 10, 1988 to Dec. 7, 1988 the date of the Spitak earthquake, at which date the tension of the structure is very high, the center of the structure having an e-value of 1,968. Three days later, on Dec. 10, 1988 the tension of the structure has decreased somewhat. The epicenter of the earthquake is located near the centre of the structure in the axial zone thereof.

From FIG. 6 the time $t_s$ after which an earthquake will occur within a period of from about 3 to about 10 days may be found as the time corresponding to the local maximum LM of the $D_e$-curve, and $t_s$ is found to be approximately Nov. 27, 1988.

Also, from FIG. 7 the $t_s$-value may be found as the time corresponding to the part S of the E-curve having a tangent, which is approximately vertical, and $t_s$ is found to be approximately Dec. 3, 1988.

As will appear from the above there is a time difference between the two $t_s$-values determined from the $D_e$-curve and the $A_e^2$-curve respectively, and this shows the significance of using both curves in order to make a reliable determination of $t_s$.

EXAMPLE 2

During a period from July 1989 to November 1989, a region covering the territories located adjacent to the San Andreas fault in California, U.S.A. was monitored using a number of observation wells to measure the water level in an aquifer of the region. On Oct. 18, 1989 the so-called Loma Prieta earthquake having a Magnitude, M, of 7.1 occurred.

On the basis of the measuring values and using an integrated central computer system the e-values were calculated, contour maps were prepared, $D_e$- and $A_e$-values were calculated and diagrams of $D_e$ vs.t and $A_e^2$ vs. t were prepared and subsidiary curves E were drawn through the points of the peaks of the diagrams of the latter type.

Figures 14, 15, 16:
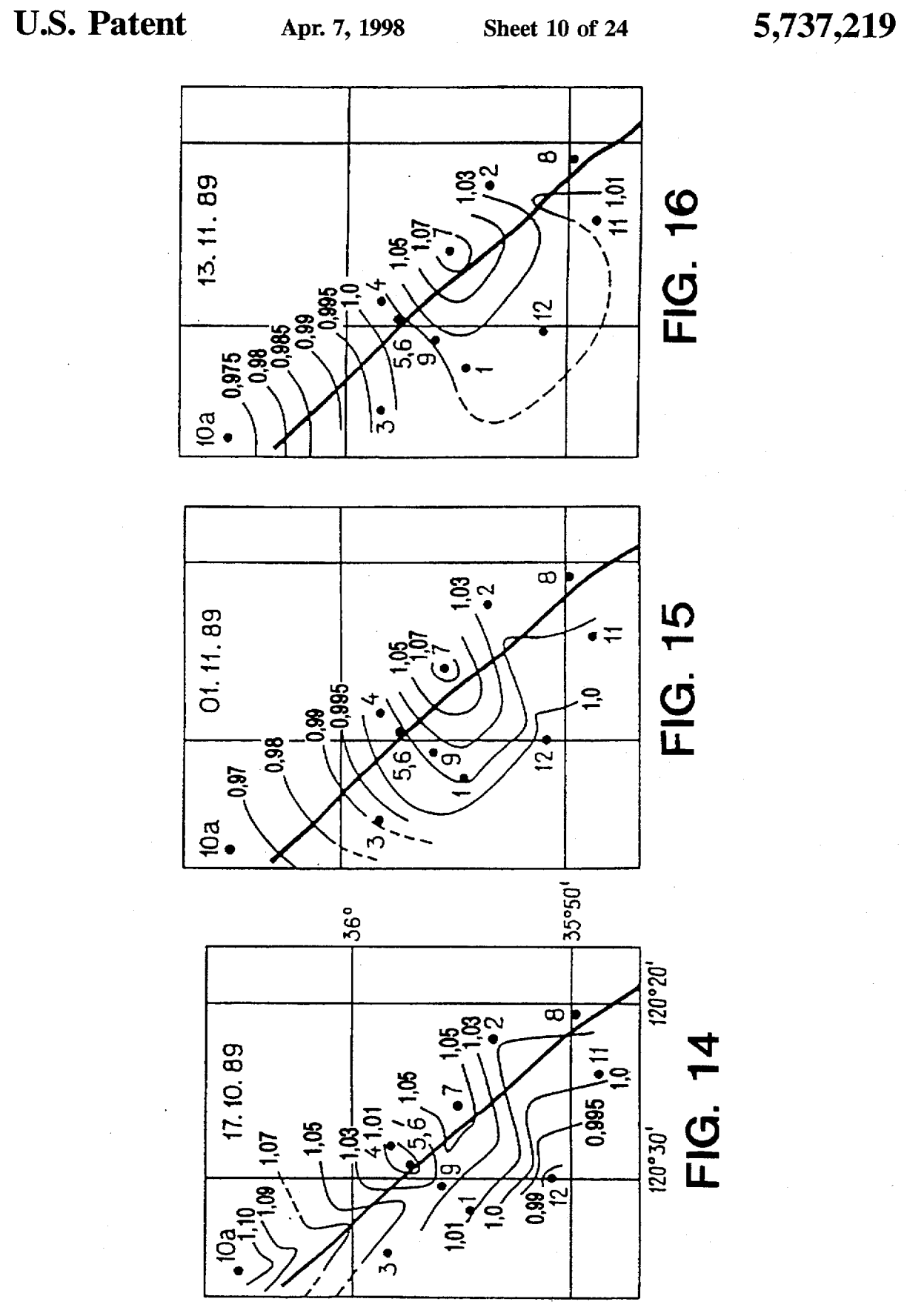

FIGS. 8–16 show contour maps of the region for a number of dates over the above mentioned period of time. In the Figures, observation wells are indicated by dots and the thick intersecting line indicates the San Andreas fault, and the Figures show e-isolines and indicate the e-values thereof.

Figure 17:
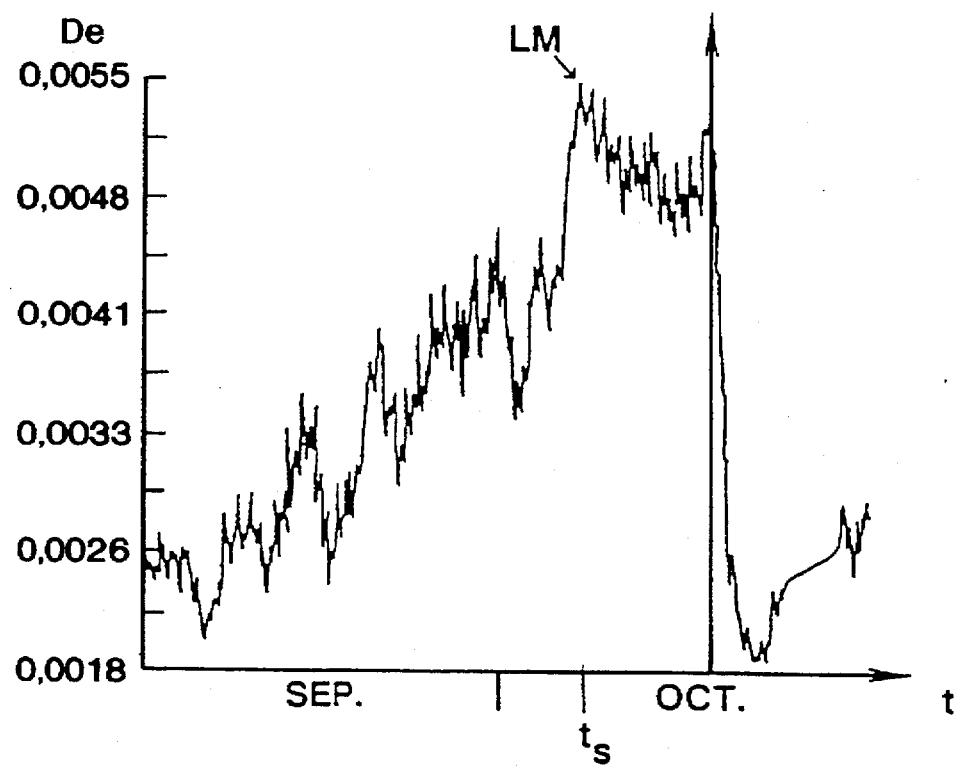
FIG. 17 shows a diagram of $D_e$ vs. t for the period during which the Loma Prieta earthquake occured.
Figure 18:
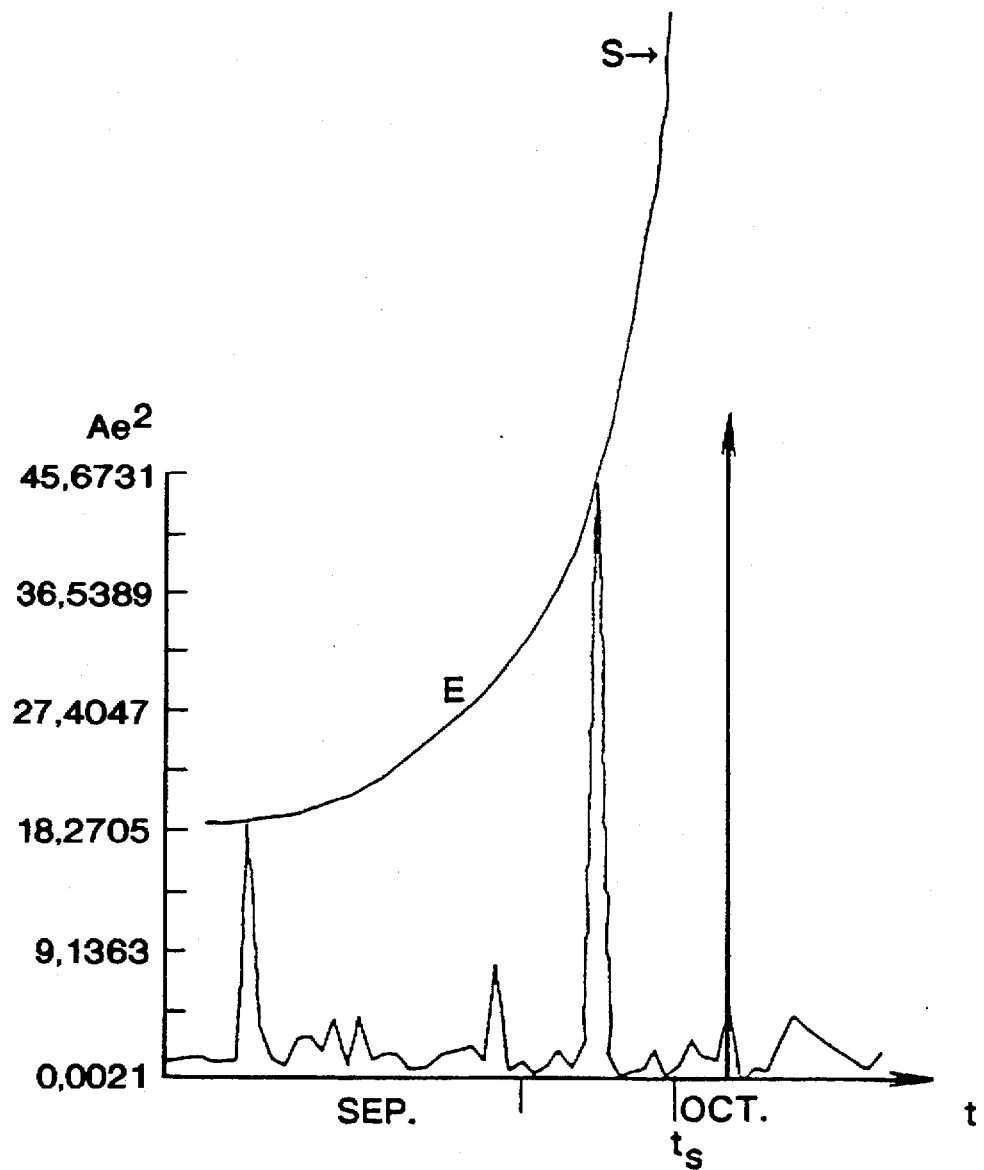
FIG. 18 shows a diagram of $A_e^2$ vs. t for the period during which the Loma Prieta earthquake occurred, the diagram being supplemented with a subsidiary curve E drawn through the top points of the peaks.

FIGS. 17 and 18 show diagrams of $D_e$ vs. t and $A_e^2$ vs.t, respectively for the period of September and October 1989, the latter diagram being supplemented with a subsiary curve E drawn through the top points of the peaks.

As will appear from the contour maps, tension is building up in the region in the period preceding Oct. 18, 1989, the date of the Loma Prieta earthquake. The region comprises a zone of expansion (e-values above unity) having two centres located approximately at observation wells 10a and 7 and a zone of compaction (e-values below unity).

From FIG. 17 the time $t_s$ after which an earthquake will occur within a period of from about 3 to about 10 days may be found as the time corresponding to the local maximum LM of the $D_e$-curve, and $t_s$ is found to be approximately Oct. 8, 1989.

Also, from FIG. 18 the $t_s$-value may be found as the time corresponding to the part S of the E-curve having a tangent, which is approximately vertical, and $t_s$ is found to be approximately Oct. 13, 1989.

EXAMPLE 3

During a period from October 1988 to June 1989, a region covering the southern part of Georgia and the northern part of Armenia was monitored using a number of observation wells to measure the water level in an aquifer of the region. On Dec. 7, 1988 the so-called Spitak earthquake having a Magnitude, M, of 6.9 occurred.

On the basis of the measuring values and using an integrated central computer system the $\Delta g_{av}$-values, the e-values, the $K_e$-values and the $K_e'$-values were calculated and diagrams of $K_e$ vs. t. $K_e'$ vs. t and $\Delta g_{av}$ vs. $K_e$ were prepared.

Figure 19:
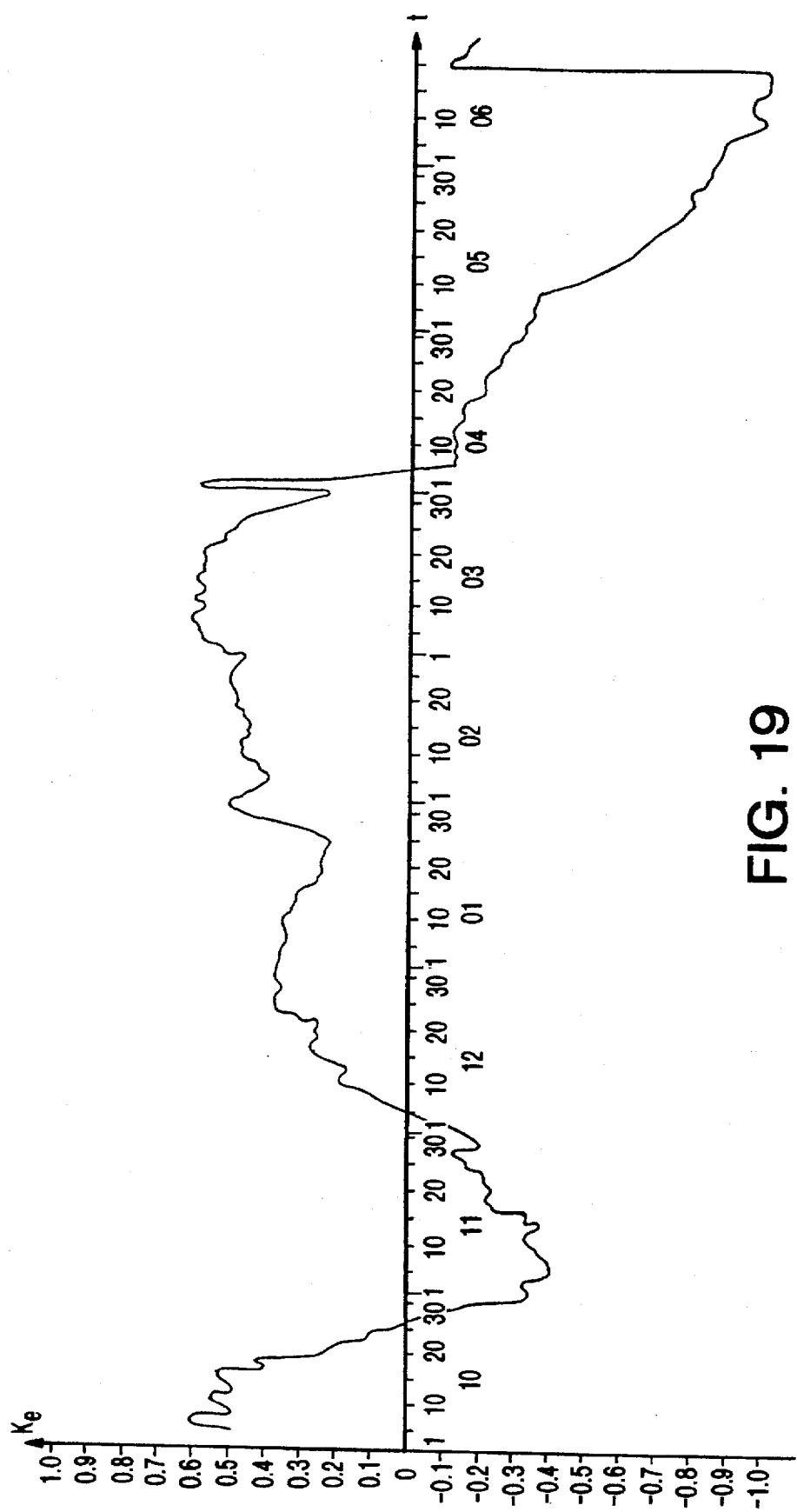
FIG. 19 shows a diagram of $K_e$ vs. t for the period during which the Spitak earthquake occurred.

FIG. 19 shows a diagram of $K_e$ vs. t for the period from the beginning of October 1988 to the end of June 1989.

As will appear from the $K_e$-curve, in the period preceding the earthquake compaction is going on in the region, the $K_e$-values being negative. Approximately at the time of the earthquake, the overall tendency of the region changes from compaction to expansion corresponding to a release of tension accumulated in the period of compaction, said release being effected through the earthquake. In the period following the earthquake expansion continues.

Figure 20A:
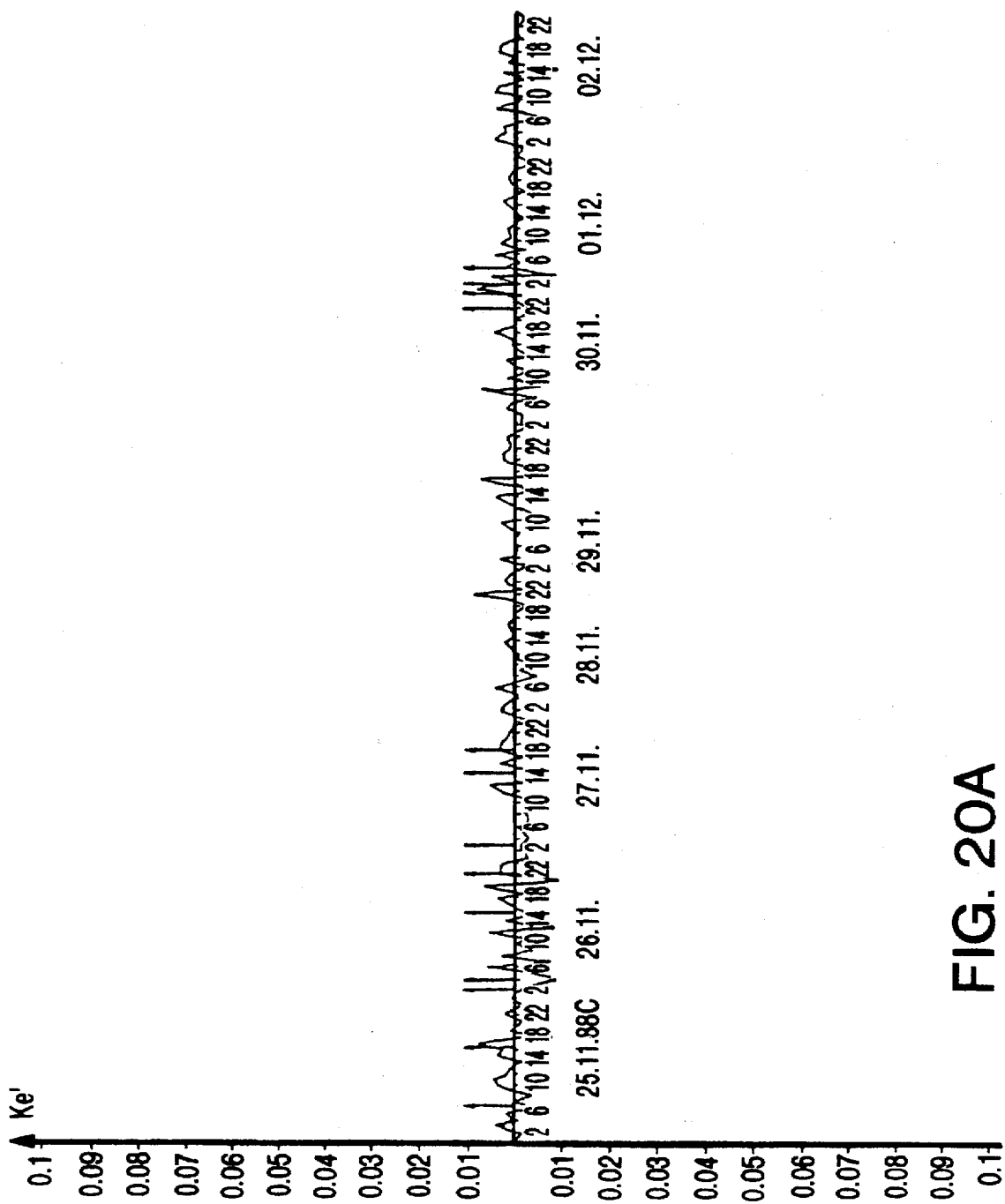
FIG. 20 shows a diagram of $K_e'$ vs. t for the period during which the Spitak earthquake occurred.
Figure 20B:
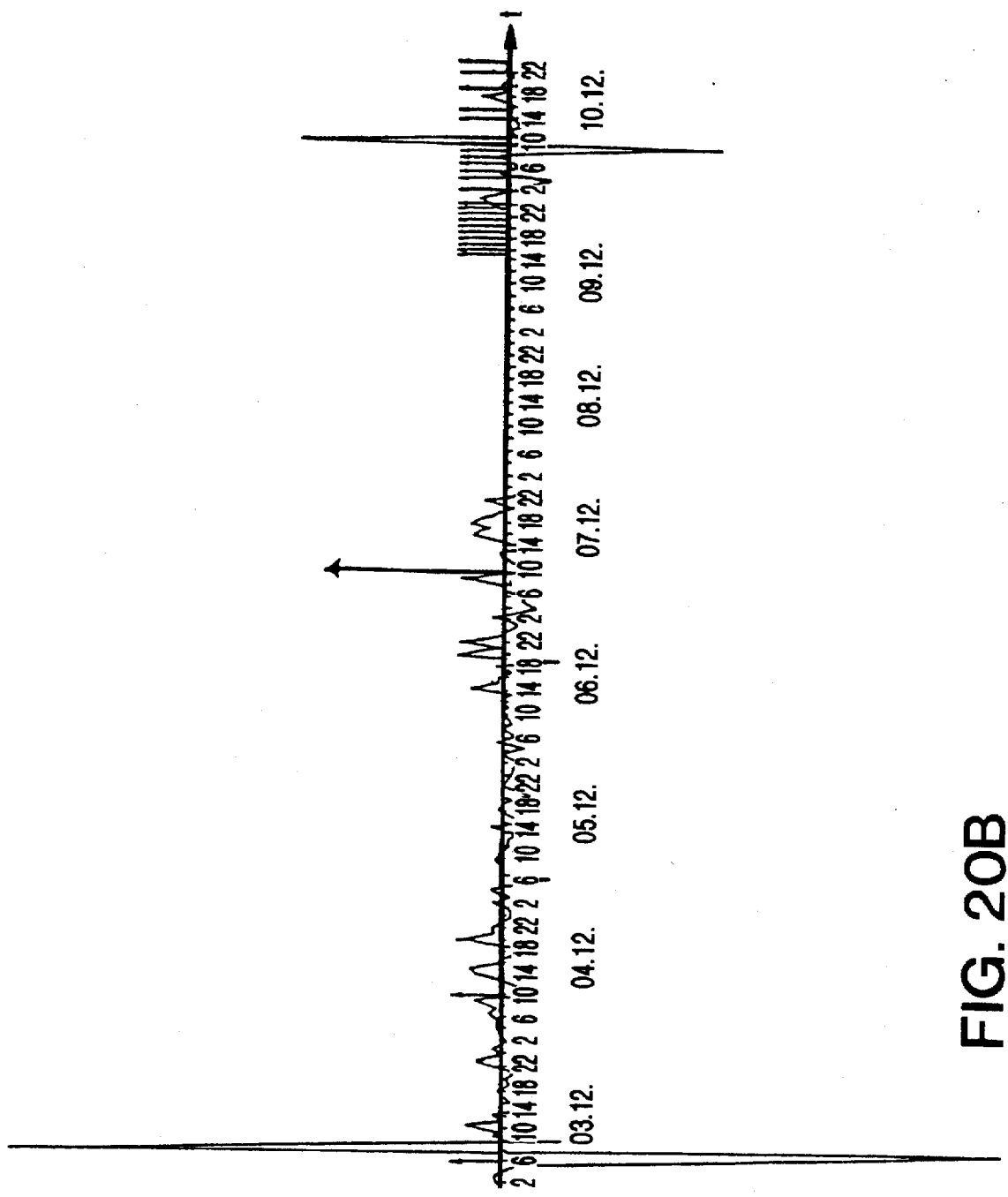

FIG. 20 shows a diagram of $K_e'$ vs. t for the period from Nov. 25, 1988 to Dec. 10, 1988. The small vertical arrows signify times of earth tremors and the large vertical arrow signifies the time of the earthquake.

As will appear from the $K_e'$-curve, the rate of deformation is very high on Dec. 3, 1988 four days prior to the earthquake.

FIGS. 21–29 show diagrams of $\Delta g_{av}$ vs. $K_e$ for nine different dates during the period from August 1986 to December 1988.

Figure 21:
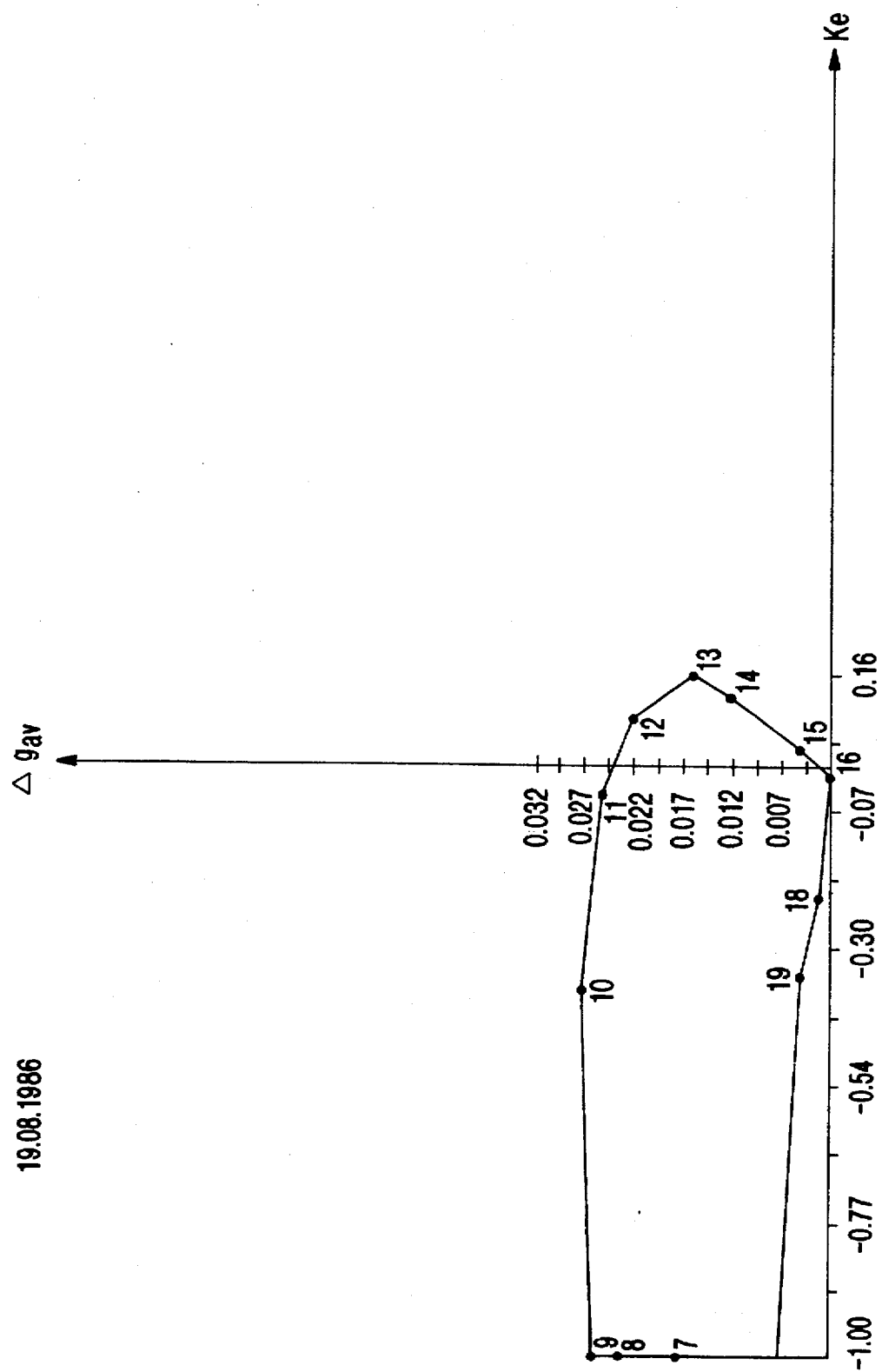
FIGS. 21–29 show diagrams of $\Delta g_{av}$ vs. $K_e$ for nine different dates in the period during which the Spitak earthquake occurred.
Figure 22:
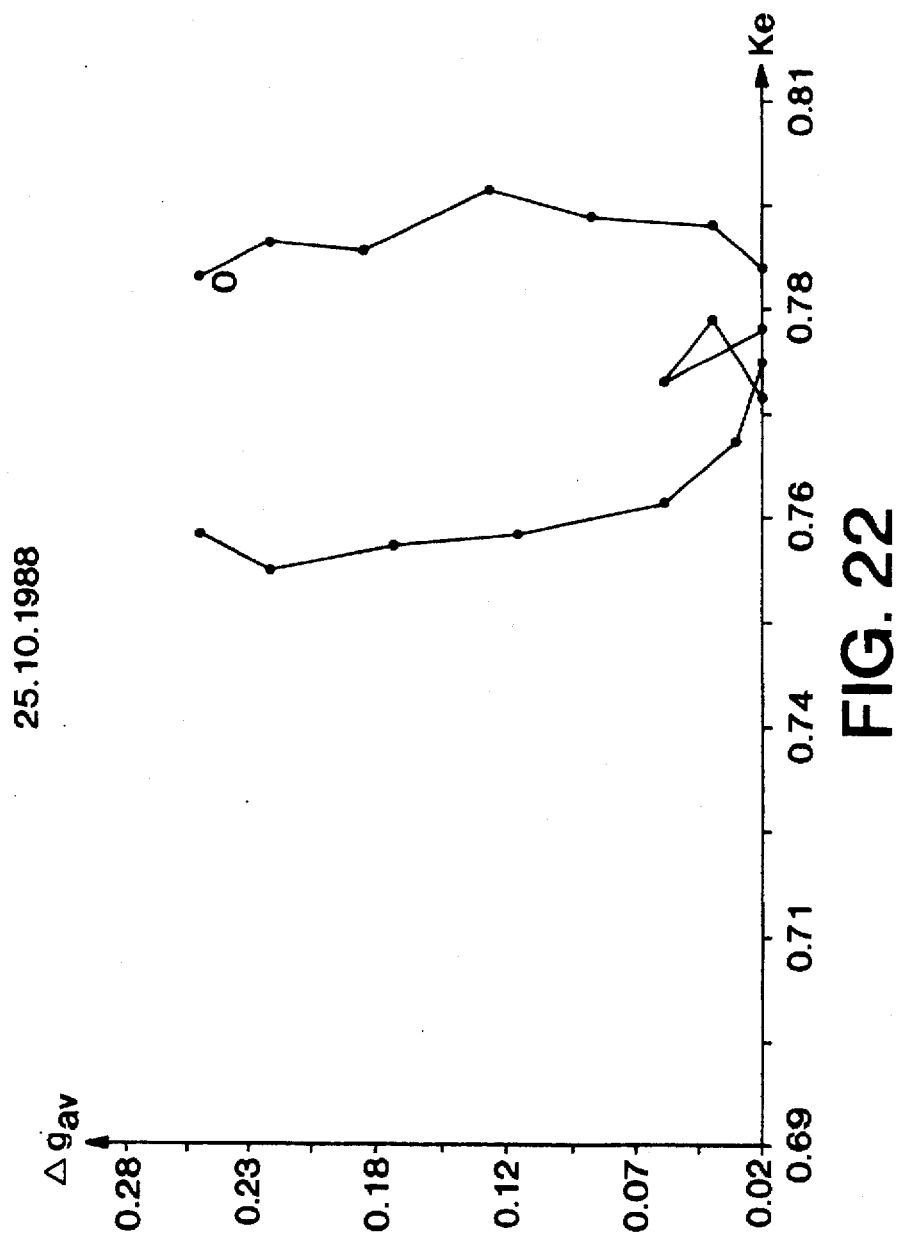
Figure 23:
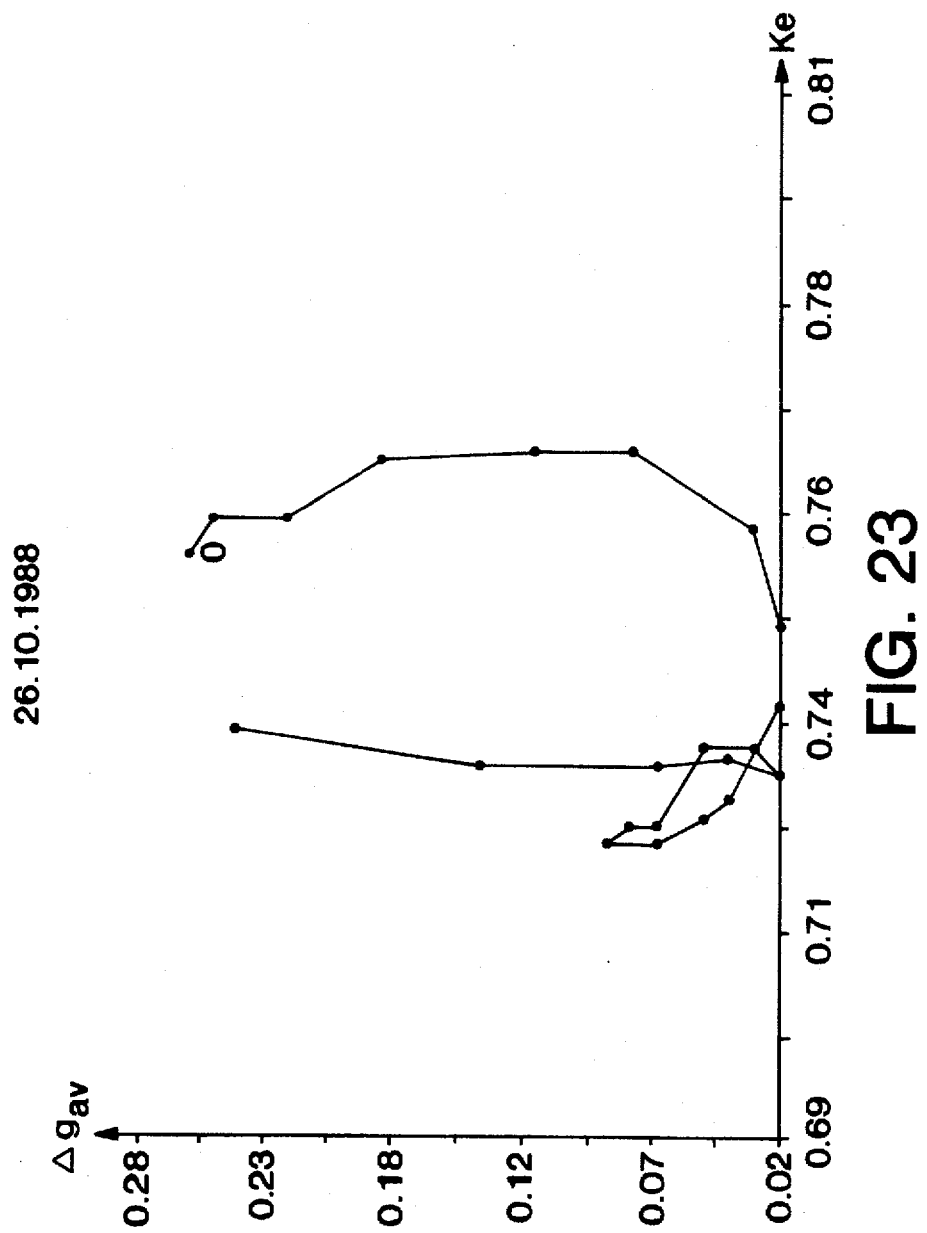
Figure 24:
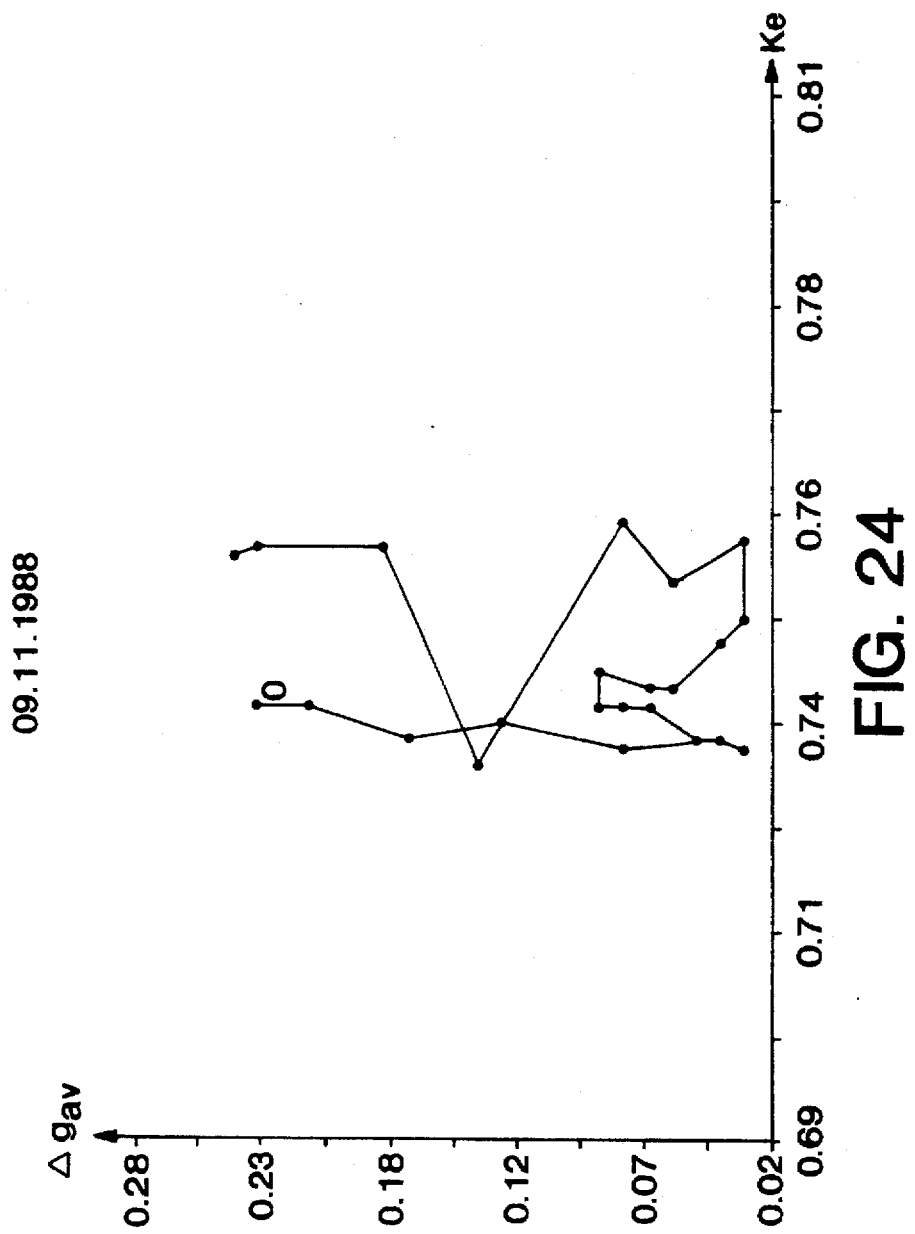
Figure 25:
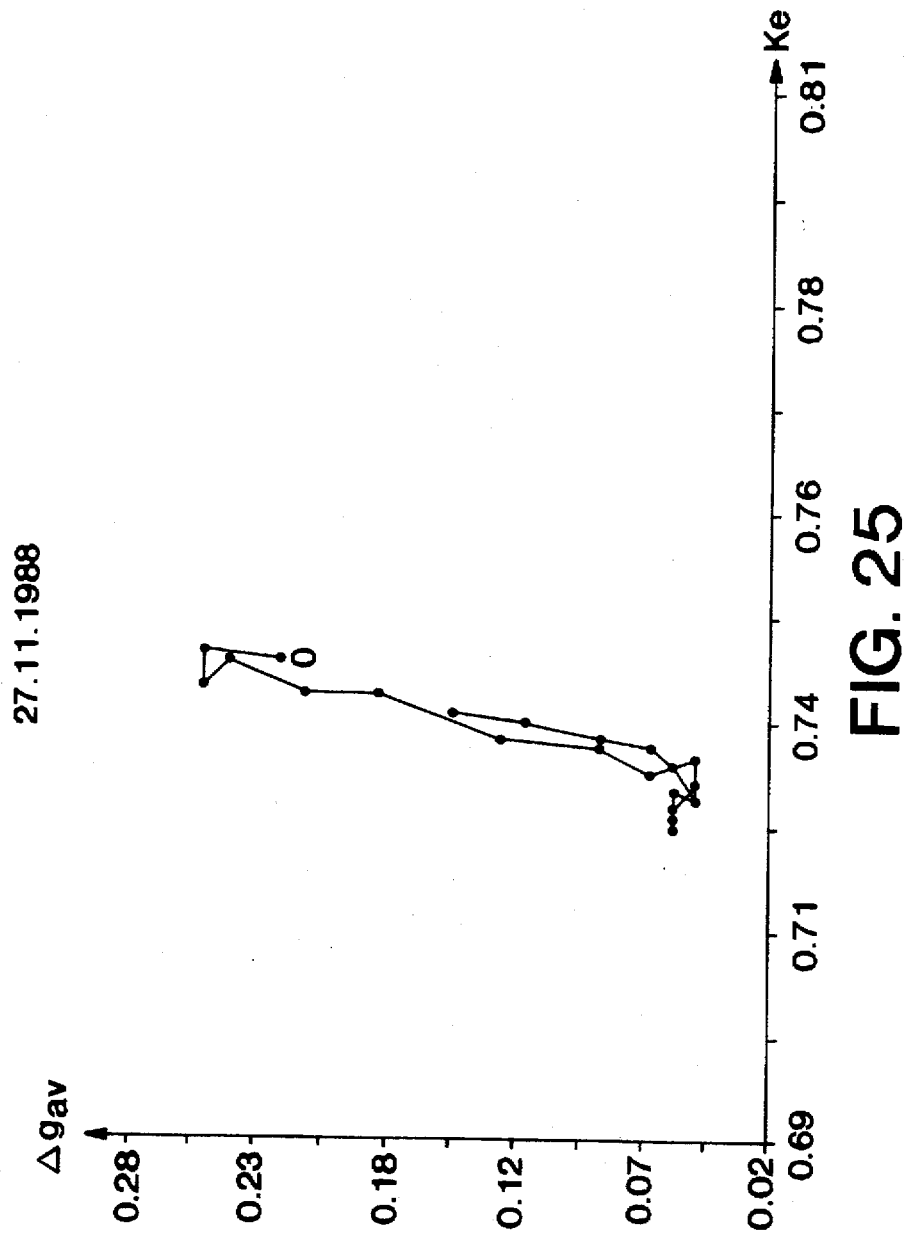
Figure 26:
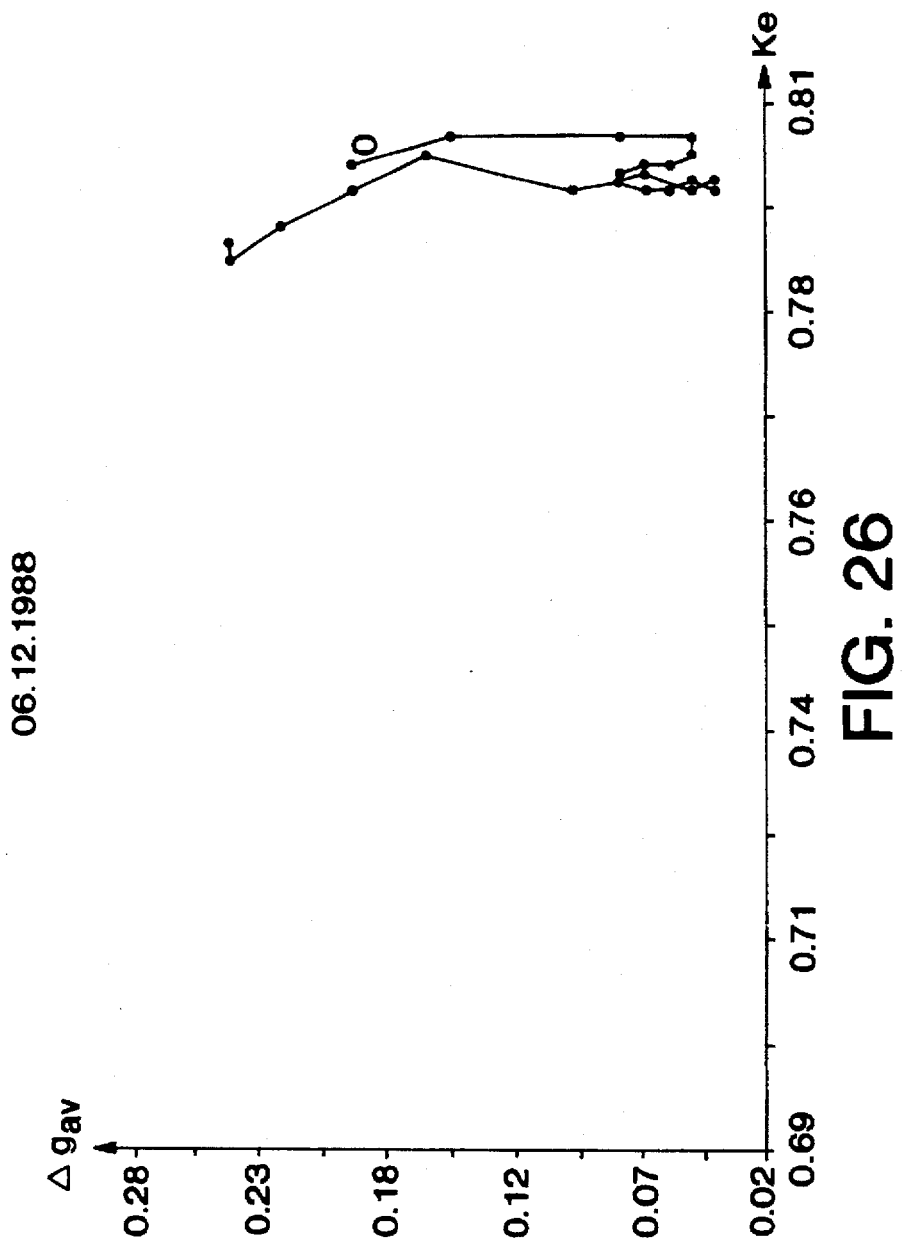
Figure 27:
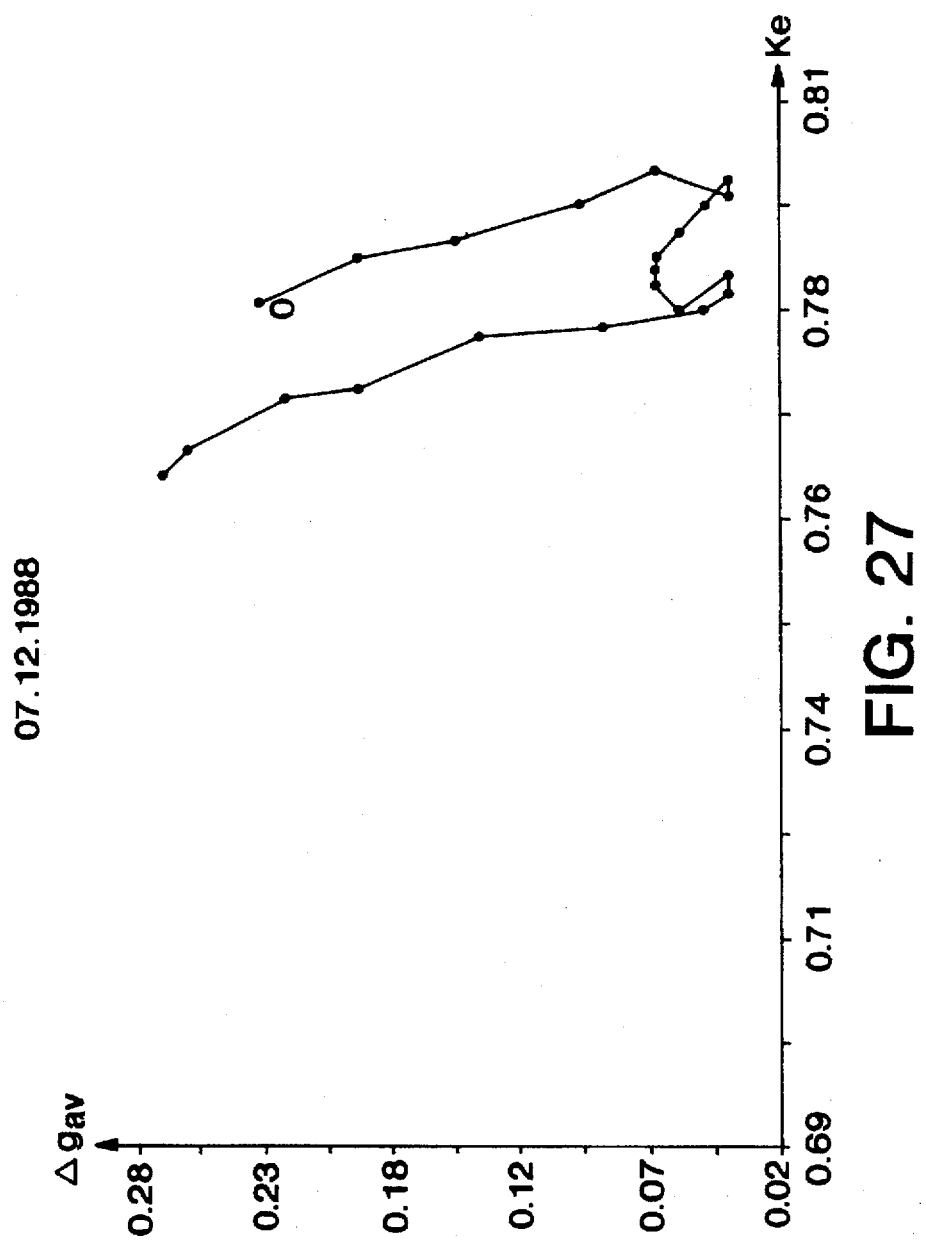
Figure 28:
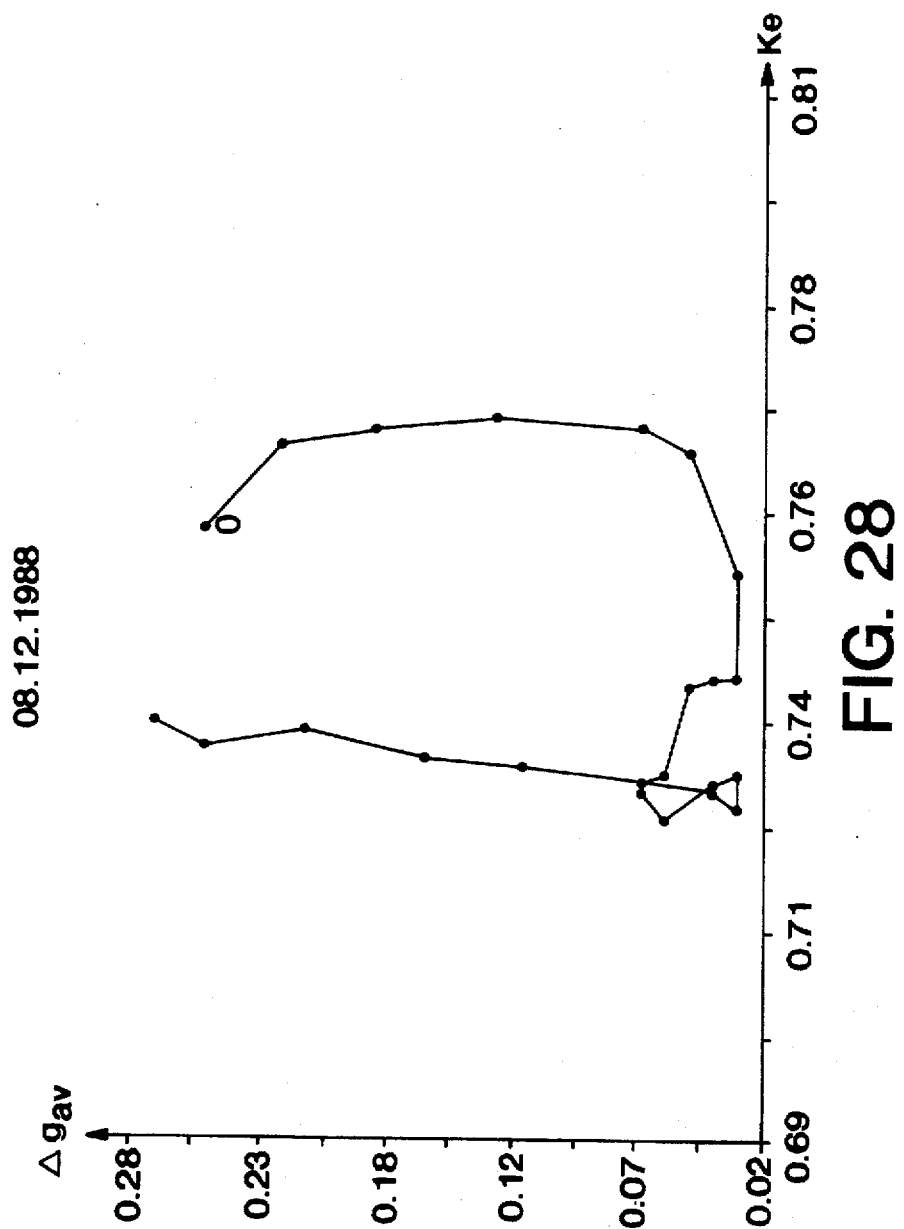
Figure 29:
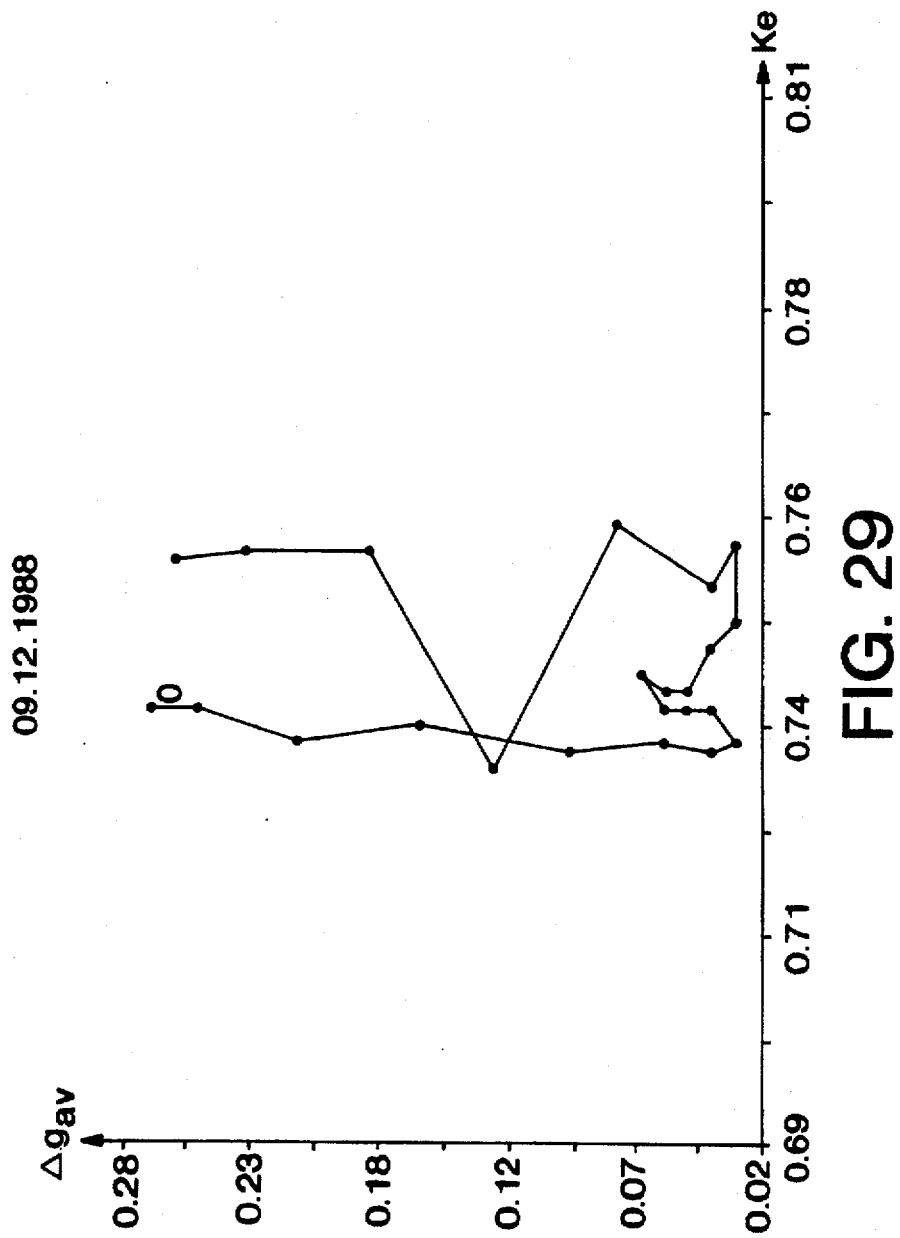

In the following, reference to the ($K_e$, $\Delta g_{av}$)-curves of FIGS. 21–19 is made. On Aug. 19, 1986 (FIG. 21) the curve had a substantially oval shape elongated in the direction of the $K_e$-axis. On Oct. 25 and 26, 1988 (FIGS. 22 and 23) the curve assumed a substantially oval shape elongated in the direction of the $\Delta g_{av}$-axis. This irregular shape of the curve means that the elasticity of the subsurface structure monitored is reduced due to a build-up of tension in the structure.

On Nov. 27, 1988 (FIG. 25) and Dec. 6, 1988 (FIG. 26), the curve assumed the approximate shape of two closely adjacent lines having an orientation in the direction of the $\Delta g_{av}$-axis, the shape signifying an almost complete loss of elasticity of the structure.

On Dec. 7, 1988 (FIG. 27), the day of the Spitak earthquake, the two lines of the curve have become more spaced, the curve having a U-shape. This shape signifies that the tension of the structure has decreased partly.

On Dec. 8 and 9, 1988 (FIGS. 28 and 29) the curve had regained an irregular oval shape signifying the fact that the structure had regained most of its initial elasticity, i.e., the accumulated tension of the structure had been released through the earthquake.

We claim:

1. A method of monitoring short-term deformation changes in a geological space and predicting seismic events, such as earthquakes and landslides, in a region, wherein it comprises the steps of:

(a) performing at different times (t=0, t=t1) measurements of one or more parameters, X, Y, Z . . . . in an aquifer in a number of locations throughout the area of the region using a corresponding number of observation wells;

(b) calculating the Relative Deformation Coefficient, e, for each location and for each parameter X, Y, Z ... on the basis of the measuring values obtained and using the formulas $$e_{t1} = \frac{X_{t=0}}{X_{t=t1}} \quad (1); \quad e_{t1} = \frac{Y_{t=0}}{Y_{t=t1}} \quad (1); \quad e_{t1} = \frac{Z_{t=0}}{Z_{t=t1}} \quad (1) \ldots$$

wherein $X_{t=0}$, $Y_{t=0}$, $Z_{t=0}$ are the values of parameter X, Y, Z respectively at time t=0 (reference time), $X_{t=t1}$, $Y_{t=t1}$, $Z_{t=t1}$ are the values of parameter X, Y, Z respectively at time t=t1;

(c) preparing a contour map of e-isolines for each parameter X, Y, Z ... on the basis of the calculated e-values and using the contour maps prepared to identify short living deformation structures of potential seismic danger;

characterized in that it comprises the additional steps of (d) calculating the Relative Deformation Parameter, $D_e$, for each structure having been identified as being of potential seismic danger, said $D_e$-parameter being defined as $$D_e = \frac{1}{2 \cdot S_{ref} \cdot e_{ref}} [(e_1 + e_2)(S_1 - S_2) + (e_2 + e_3)(S_2 - S_3) + \ldots + (e_{n-1} + e_n)(S_{n-1} - S_n)] \quad (2)$$

wherein $e_1, e_2, e_3, \ldots, e_{n-1}$ and $e_n$ are e-values of e-isolines in the structure, $S_1, S_2, S_3, \ldots, S_{n-1}$ and $S_n$ are the areas delimited by isolines $e_1, e_2, e_3, \ldots, e_{n-1}$ and $e_n$ respectively, $S_{ref}$ is a reference area, $e_{ref}$ is a reference e-value, and n is a positive integer;

(e) calculating the Parameter of Seismic Attack, $A_e$, defined as $$A_e = \frac{\partial D_e}{\partial t}, \text{ and} \quad (3)$$

(f) preparing a diagram of $D_e$ vs. t and a diagram of $A_e^m$ vs. t, wherein m is a positive integer, drawing a subsidiary curve E through the top points of the peaks of the latter diagram and using the two resulting diagrams in combination as a basis for predicting the time of a possible future seismic event.

2. A method according to claim 1, characterized in using as measuring parameters X, Y, Z ... one or more of the parameters water level, water pressure, concentration of dissolved chemical substances, equilibrium of chemical substances, concentration of gases, water temperature, electrical conductivity of water, water density, seismic noise, electromagnetic emission, gravity variation or other.

3. A method according to claim 2, characterized in using the water level, h, as a measuring parameter and calculating e using the formula $$e_{t1} = \frac{h_o}{h_{t1}} \quad (4)$$

wherein $h_o$ is the water level at t=0, and $h_{t1}$ is the water level at t=t1.

4. A method according to claim 1, characterized in using a diagram of $A_e^m$ vs. t, wherein m is a positive, even integer.

5. A method according to claim 4, characterized in using a diagram of $A_e^m$ vs. t wherein m is 2 or 4.

6. A method according to claim 1, characterized in (g) performing measurements in a number of locations throughout the area of the region of gravity change, $\Delta g_1, \Delta g_2, \ldots, \Delta g_k$, wherein k is a positive integer, and calculating the average gravity change, $\Delta g_{av}$;

(h) calculating the Parameter of Imbalanced Deformation $K_e$ for the region, said $K_e$-parameter being defined as $$K_e = \frac{e_{p,t1} + e_{c,t1} - 2}{e_{p,t1} - e_{c,t1}} \quad (5)$$

wherein $e_{p, t1}$ is the average e-value at t=t1 for all locations showing expansion (e>1), $e_{c}$, t1 is the average e-value at t=t1 for all locations showing compaction (e<1);

(i) preparing a diagram of $K_e$ vs. t, a diagram of $$K_e' = \frac{\partial K_e}{\partial t} \text{ vs. } t$$

and a diagram of $\Delta g_{av}$ vs. $K_e$ and using the three diagrams in combination as an additional information forming the basis for predicting possible future seismic events.

7. A method of monitoring long-term geodynamic processes in a region, wherein it comprises the steps of:

(o) performing at different times (t=0, t=t1) measurements of one or more parameters X, Y, Z ... in an aquifer in a number of locations throughout the area of the region using a corresponding number of observation wells;

(p) calculating the Relative Deformation Coefficient, e, for each location and for each parameter X, Y, Z ... on the basis of the measuring values obtained and using the formulas $$e_{t1} = \frac{X_{t=0}}{X_{t=t1}} \quad (1); \quad e_{t1} = \frac{Y_{t=0}}{Y_{t=t1}} \quad (1); \quad e_{t1} = \frac{Z_{t=0}}{Z_{t=t1}} \quad (1) \ldots$$

wherein $X_{t=0}$, $Y_{t=0}$, $Z_{t=0}$ are the values of parameter X, Y, Z respectively at time t=0 (reference time), $X_{t=t1}$, $Y_{t=t1}$, $Z_{t=t1}$ are the values of parameter X, Y, Z respectively at time t=t1;

characterized in that it comprises the additional steps of:

(q) performing measurements in a number of locations throughout the area of the region of gravity change, $\Delta g_1, \Delta g_2, \ldots, \Delta g_k$, wherein k is a positive integer, and calculating the average gravity change, $\Delta g_{av}$;

(r) calculating the Parameter of Imbalanced Deformation $K_e$ for the region, said $K_e$-parameter being defined as $$K_e = \frac{e_{p,t1} + e_{c,t1} - 2}{e_{p,t1} - e_{c,t1}} \quad (5)$$

wherein $e_{p, t1}$ is the average e-value at t=t1 for all locations showing expansion (e>1), $e_{c}$, t1 is the average e-value at t=t1 for all locations showing compaction (e<1);

(s) preparing a diagram of $K_e$ vs.t, a diagram of $$K_e' = \frac{\partial K_e}{\partial t} \; vs.t$$

and a diagram of $\Delta g_{av}$ vs. $K_e$ and using the three diagrams in combination as a basis for detecting possible future geodynamic events.

8. A method according to claim 7, characterized in preparing a contour map of e-isolines for each parameter X, Y, Z . . . on the basis of the calculated e-values and using the contour maps prepared as an additional information forming the basis for detecting possible future geodynamic events.

9. A method according to claim 7, characterized in using a central automatic data processing unit to register and store all measuring values and to automatically perform all the subsequent calculations and preparations of contour maps and various diagrams.

* * * * *